(12) United States Patent
Kuzikov

(10) Patent No.: US 10,967,964 B2
(45) Date of Patent: Apr. 6, 2021

(54) AIR WHEEL ROTOR, A GYRO STABILIZED AIRCRAFT AND A WIND-DRIVEN POWER GENERATOR USING THE AIR WHEEL ROTOR, AND A STATIONARY LAUNCHING DEVICE

(71) Applicant: Sergei Yurevich Kuzikov, Saint Petersburg (RU)

(72) Inventor: Sergei Yurevich Kuzikov, Saint Petersburg (RU)

(*) Notice: Subject to any disclaimer, the term of this patent is extended or adjusted under 35 U.S.C. 154(b) by 0 days.

(21) Appl. No.: 15/441,670

(22) Filed: Feb. 24, 2017

(65) Prior Publication Data
US 2017/0320564 A1 Nov. 9, 2017

Related U.S. Application Data

(63) Continuation of application No. PCT/RU2014/000636, filed on Aug. 26, 2014.

(51) Int. Cl.
| | | |
|---|---|---|
| *B64C 27/33* | (2006.01) | |
| *B64C 39/06* | (2006.01) | |
| *B64C 11/18* | (2006.01) | |
| *B64C 11/28* | (2006.01) | |
| *B64C 27/37* | (2006.01) | |

(Continued)

(52) U.S. Cl.
CPC .............. *B64C 27/33* (2013.01); *B64C 11/18* (2013.01); *B64C 11/28* (2013.01); *B64C 27/37* (2013.01); *B64C 27/467* (2013.01); *B64C 27/473* (2013.01); *B64C 39/06* (2013.01); *F03D 3/061* (2013.01); *F03D 3/062* (2013.01); *B64C 27/02* (2013.01); *B64C 27/20* (2013.01); *B64C 27/22* (2013.01); *F05B 2240/311* (2013.01);

(Continued)

(58) Field of Classification Search
CPC . F01D 5/3053; F01D 5/30; F01D 7/00; F03D 1/065; F05B 2240/311
USPC .......................................................... 416/131
See application file for complete search history.

(56) References Cited

U.S. PATENT DOCUMENTS 3,606,209 A * 9/1971 Rostas .................... B64C 27/20
4,560,358 A 12/1985 Adler
(Continued)

FOREIGN PATENT DOCUMENTS

| RU | 2145293 C1 | 2/2000 |
| RU | 134150 U1 | 11/2013 |

*Primary Examiner* — Kenneth Bomberg
*Assistant Examiner* — Jason Mikus
(74) *Attorney, Agent, or Firm* — Hayes Soloway PC

(57) ABSTRACT

The 'Air Wheel' rotor is a variable pitch rotor with variable twist blades. The 'Air Wheel' rotor comprises a closed wing coupled to one or more coaxial hubs via torsional elastic blades, the blades are coupled to the closed wing in one of the following ways: rigid, elastic, or visco-elastic. There is provided a wide range of combinations of the wing relative width and coning angle typical for a lifting rotor with a thin planar wing attached to the tips of long blades, for a shrouded fan in a wide annular wing, or for an impeller in a rotating cylindrical wing.

Figure 1:
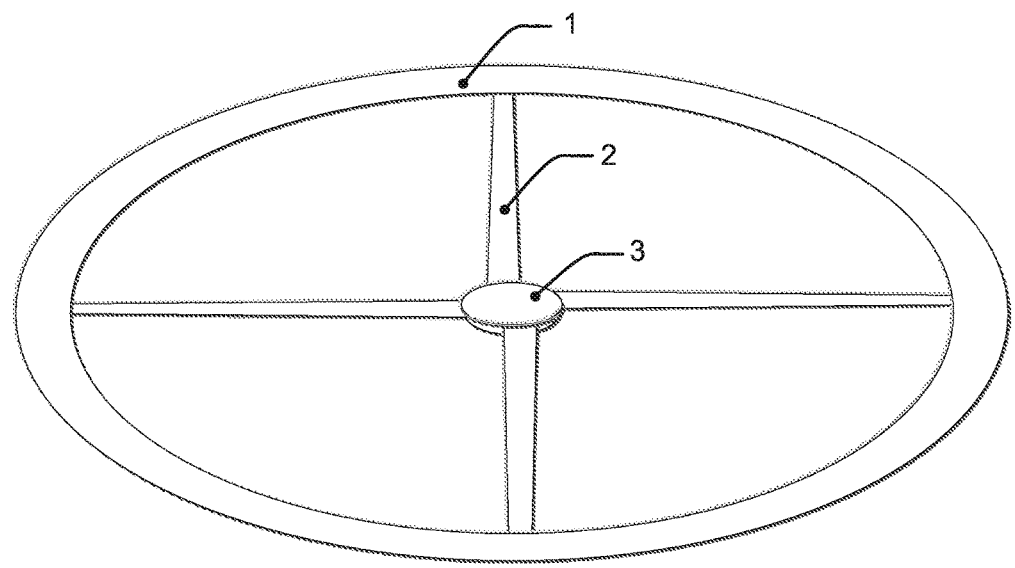

The 'Air Wheel' rotor combines and enhances the advantages of a rotor and a wing, it has excellent aerodynamic characteristics, and eliminates limitations of the rotor size and flight speed. The 'Air Wheel' rotor can be used for designing vertical take-off and landing aircraft.

The "Air Wheel" rotor is universal and can function as a lifting rotor, or a wind turbine, or an aircraft propeller, or a marine propeller.

15 Claims, 15 Drawing Sheets

(51) Int. Cl.
- *B64C 27/467* (2006.01)
- *B64C 27/473* (2006.01)
- *F03D 3/06* (2006.01)
- *B64C 27/22* (2006.01)
- *B64C 27/20* (2006.01)
- *B64C 27/02* (2006.01)

(52) U.S. Cl.
CPC ........... *F05B 2240/33* (2013.01); *Y02E 10/72* (2013.01); *Y02E 10/74* (2013.01)

(56) References Cited

U.S. PATENT DOCUMENTS

| | | | |
|---|---|---|---|
| 5,868,351 A * | 2/1999 | Stamps | B64C 27/50 244/12.4 |
| 6,086,016 A * | 7/2000 | Meek | B64C 27/02 244/17.11 |
| 6,781,254 B2 | 8/2004 | Roberts | |
| 6,845,941 B2 | 1/2005 | Pica | |
| 6,945,747 B1 * | 9/2005 | Miller | F03D 1/025 415/4.3 |
| 7,204,453 B2 * | 4/2007 | Muren | B64C 27/10 244/17.11 |
| 7,607,892 B2 * | 10/2009 | Beroul | B64C 27/51 416/106 |
| 7,938,623 B2 * | 5/2011 | Cairo | F03D 1/065 416/226 |
| 2004/0113013 A1 * | 6/2004 | Pica | B64C 27/22 244/10 |
| 2010/0266412 A1 | 10/2010 | Barber | |
| 2010/0320769 A1 * | 12/2010 | Miranda | F03D 15/00 290/55 |
| 2011/0031760 A1 * | 2/2011 | Lugg | F03D 1/025 290/55 |
| 2011/0309625 A1 | 12/2011 | Dehlsen et al. | |
| 2013/0121832 A1 | 5/2013 | Barber | |

\* cited by examiner a b

AIR WHEEL ROTOR, A GYRO STABILIZED AIRCRAFT AND A WIND-DRIVEN POWER GENERATOR USING THE AIR WHEEL ROTOR, AND A STATIONARY LAUNCHING DEVICE

This application is a continuation of International application PCT/RU2014/000636 filed on 26 Aug. 2014 which is incorporated herein by reference for all purposes.

The present invention relates to aviation and, more particularly, to rotary-winged aircraft. The rotor can also be used for wind power generation.

A heavier-than-air aircraft typically employs wings or rotors to provide lift. A rotor is effective for low speed flights, while a fixed wing is effective for high speed flights. Using only one of these options for creating lift results in a limited speed range for an aircraft. On the other hand, improper usage of both of these options can combine their disadvantages.

A rotor with a plane annular wing is intended for high-speed vertical take-off and landing (VTOL) rotary-winged aircraft, but here the rotor is used only for creating lift. During horizontal or level flight, the rotor operates in an autorotation mode, and the outer wing moves through the air at a positive angle of attack, thus creating the main lift. Heading hold is provided by a cruising propeller or a jet drive.

An objective of the invention is to provide an optimal rotor with high aerodynamic and operational properties and to provide an efficient gyro stabilized aircraft.

This objective is achieved by providing a rotor with blades of variable pitch and variable twist, wherein the rotor comprises a closed wing coupled to one or more coaxial hubs via torsional elastic blades, the blades being coupled to the closed wing in one of a rigid, elastic, and viscoelastic manner.

In one embodiment, the rotor comprises a device for controlling a collective pitch, or collective and cyclic pitch.

In another embodiment, the blade pitch is controlled, in part or in whole, by setting relative position of two hubs, such as spin, tilt, shift.

In yet another embodiment, the torsional elastic blades have a variable profile camber.

In yet another embodiment, at least one of torsional and/or bending rigidity of any of the blades is varying along thereof.

In yet another embodiment, the blades have a complex three-dimensional shape comprising at least one of bends, flares, Y-junctions, tapers, junctures, supporting struts, and tiltable slats and flaps.

In yet another embodiment, the blades are moveably coupled to the one or more hubs by a torsion bar or by a feathering hinge.

In yet another embodiment, the blades are rigidly coupled to the one or more hubs, the blades being equipped with tiltable flaps.

In yet another embodiment, one of the blades and the tiltable flaps are moveably coupled in a viscoelastic manner or by integrating a vibration damper.

In yet another embodiment, the blades and the wing are flexible and have internal volumes that can be filled with gas or liquid at positive pressure to increase rigidity of the flexible rotor.

In yet another embodiment, the rotor is foldable and comprises jointed segments of the wing and blades.

In yet another embodiment, the closed wing can function as a rotor of an electrical machine, such as motor-generator, electrical motor, magnetic braking system, magnetic bearing.

Further, the invention provides a gyro-stabilized aircraft comprising one or more of the disclosed rotors.

Further, the invention provides a wind-driven power generator comprising one or more of the disclosed rotors.

Further, the invention provides a stationary launching device for initial acceleration of the disclosed rotor.

The claimed solution provides a number of new structural components and bonds:

1. One outer closed wing and any number of blades and hubs.
2. The outer closed wing of any three-dimensional shape (generally axisymmetric) and any coning angle (i.e. the shape can vary from planar to cylindrical). Relative width of the wing can vary from a thin rim attached to the tips of long blades to a wide wing with a small internal impeller.
3. The rotor can be equipped with one, two, or more hubs intended for blade attaching.
4. The hubs can be of any shape and size. There can be several blade attachment planes, which may not coincide with the wing plane.
5. The rotor is equipped with a control device for controlling the blade collective pitch and cyclic pitch. The united rotor control system is unified for all the flight modes.
6. Blade pitch control and optional hubs-to-wing relative positioning control are provided.
7. The blades, which are not exactly radial, can have various sweeps, complex three-dimensional shapes, bends, flares, Y-junctions, tapers, junctures, supporting struts, and tiltable slats and flaps.
8. The blade airfoil section can vary within a wide relative thickness range: from wide to extremely thin.
9. An effective rotor is provided with a variable pitch, wherein torsional blades of high torsional flexibility have a variable twist.
10. Torsional rigidity of each blade can vary, e.g. the rigidity can smoothly increase from the blade shank to the tip and decrease at the wing-blade juncture area.
11. Thin elastic blades can vary their profile camber; blades with a rigid fixed leading edge and tiltable flaps are provided.
12. Only rigid and elastic or viscoelastic blade-to-wing fastening (without hinges) is optimal. No feathering hinges are used in a wing-blade juncture.
13. The same blade can be attached to different hubs. Blades can be attached to hubs via rigid, elastic, viscoelastic fastening or by means of hinges. These ways of fastening can be realized by direct fastening or fastening via a torsion bar or a feathering hinge.
14. For folding and elastic modifications of the rotor, moveable sliding juncture of components can be provided, as well as the use of joints.
15. The closed wing can operate as a rotor of an electrical drive motor, motor-generator, or magnetic braking system.
16. A rotating rotor can accommodate fuel, accumulator batteries, fuel cells, engines, propulsive nozzles, solar array panels, sensors, antennas, balancers, indicator lights, anti-icing systems, signalling cables, power wiring, and other equipment and airframe components.

The above features provide the following:

Decreasing acoustic noise produced by the rotor.

Rigidity of the rotor increases with the elimination of imbalance and vibrations.

Risks arising from ground resonance and hazardous events typically occurring during the flight are eliminated.

Limitations to the rotor size are eliminated. Scalability is higher.

Design limitations to the maximum speed value are eliminated; the range of safe flight speed values becomes wider.

The blades with variable twist have the highest possible efficiency for both autorotation and helicopter modes.

Thin blades with twist equal to zero have the minimum rotor profile drag in case of high-speed level flight.

Increased lift-to-drag ratio, maximum speed, flying distance and availability time. Fuel consumption and the cost per flight-hour decrease.

The balanced rotor is used as a flywheel (a kinetic energy storage system of high performance and capacity).

The aircraft load lifting capacity, weight and energy figures of merit, or energy perfection, increase.

A rigid rotor with two hubs can provide flywheel control of the aircraft. The losses in lift-to-drag ratio related to longitudinal trim and lateral trim are decreased.

The atmospheric turbulence effects arising during the flight decrease.

All-weather capability is provided. Reliable vertical take-off and vertical landing under adverse conditions are provided.

The power unit performance and reliability requirements are lower.

Operation of the aircraft is easier. The control and stabilization system is simpler. There is an option for fully automated flight.

Light and elastic blades reduce the loads in feathering hinges and control system. Operating time of the rotor and reliability of the control system are higher.

The new automated systems for pitch control/swashplates make the united control system unified for all the flight modes simpler.

The designs of the rotor and the whole aircraft are simpler. The technological efficiency is higher. The production costs are lower.

Basically, a rotor with two hubs can provide rigid fixation of the closed wing rotation plane, thus ensuring gyrostabilization of the aircraft. The rotor design is the same as for a bicycle wheel, where the blades like spokes provide fixation of the rim (wing) plane. Considering similar appearance, the disclosed rotor is referred to as the 'Air Wheel' rotor.

In general, vibration in a rotary-winged aircraft causes many problems. Passengers and crew feel discomfort from vibration. Vibration also causes the design of the aircraft body and transmission to have added weight, while decreasing the rotor and control system operating time. The main cause of vibration is imbalance of the conventional rotors that cannot be eliminated. The only rotor that can be stabilized is that having a rigid planform. The outer planar profile encompasses the loads providing a rigid planform of the 'Air Wheel' rotor. Vibration is eliminated. Operating time of the rotor and its design maximum speed, which in the case of rotor-winged aircraft are limited by the strength of the rotor and the control system, increase significantly.

VTOL-type aircraft are not tied to airdromes; however, VTOL-type aircraft cannot be freely used due to their high level of noise production. In the case of an off-axis flow, any rotating propeller is subjected to alternating loads. During the flight, thick straight radially arranged blades of an unshrouded rotor generate standard slaps with vortex formation at the blade tips. An array of thin crescent-shaped blades arranged within a closed profile with various sweeps and angular deviations significantly decreases the amplitude of such vibrations. A mere use of a rim cannot entirely eliminate them. Silent operation of the 'Air Wheel' rotor during the flight is provided by the set of measures, including use of a closed wheel having a complex axisymmetric shape.

A high-speed bulk flywheel can accumulate and quickly deliver huge amounts of energy directly to blades without a motor, complex transmission, anti-torque moment, and excess noise. Use of a flywheel ensures high thrust/weight ratio and aircraft robustness in case of failure of the motor, gearbox, and other aircraft systems.

The rotor size decreases and the payload weight increases. Diameter of the rotor of a helicopter is defined by the power unit performance and the takeoff weight. Use of a flywheel eliminates this dependence. Reliable high-speed vertical take-off can be provided by means of a rotor with a smaller diameter and even by a shrouded fan regardless of the power unit performance and the takeoff weight.

The 'Air Wheel' rotor as a powered gyroscope provides longitudinal and lateral flywheel control. An aircraft is gyro-stabilized and stable while not suffering from atmosphere turbulence. An active level stabilization can be provided by means of the controlled rotor blades with high flywheel kinetic energy. Thus, an all-weather aircraft can be designed.

The invention will be better understood with reference to the following illustrative and non-limiting drawings:

FIG. 1. Perspective view of the four-blade 'Air Wheel' rotor.

Figure 2:
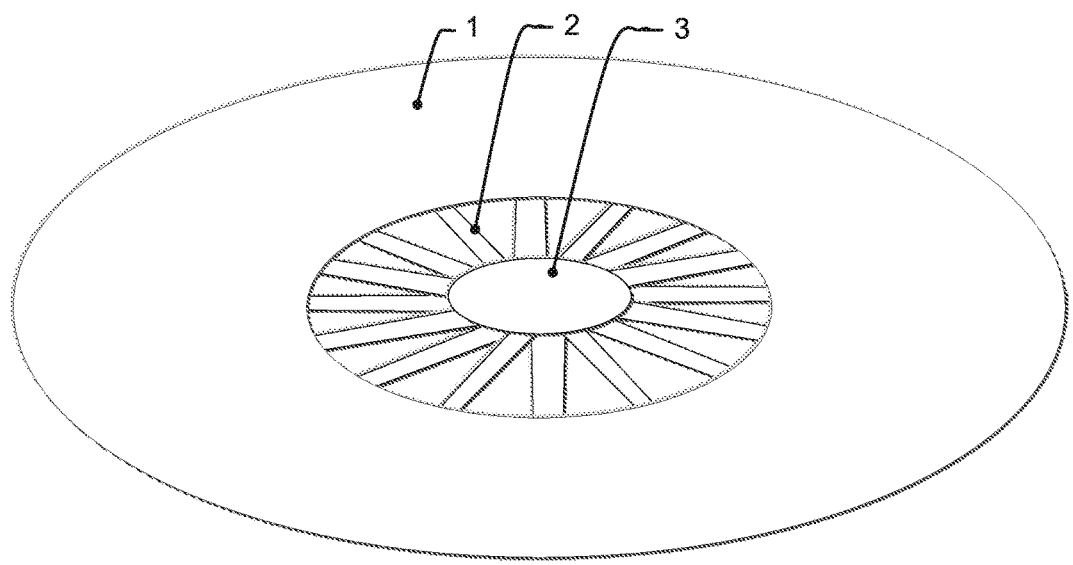

FIG. 2. Perspective view of the 'Air Wheel' rotor lifting fan.

Figure 3:
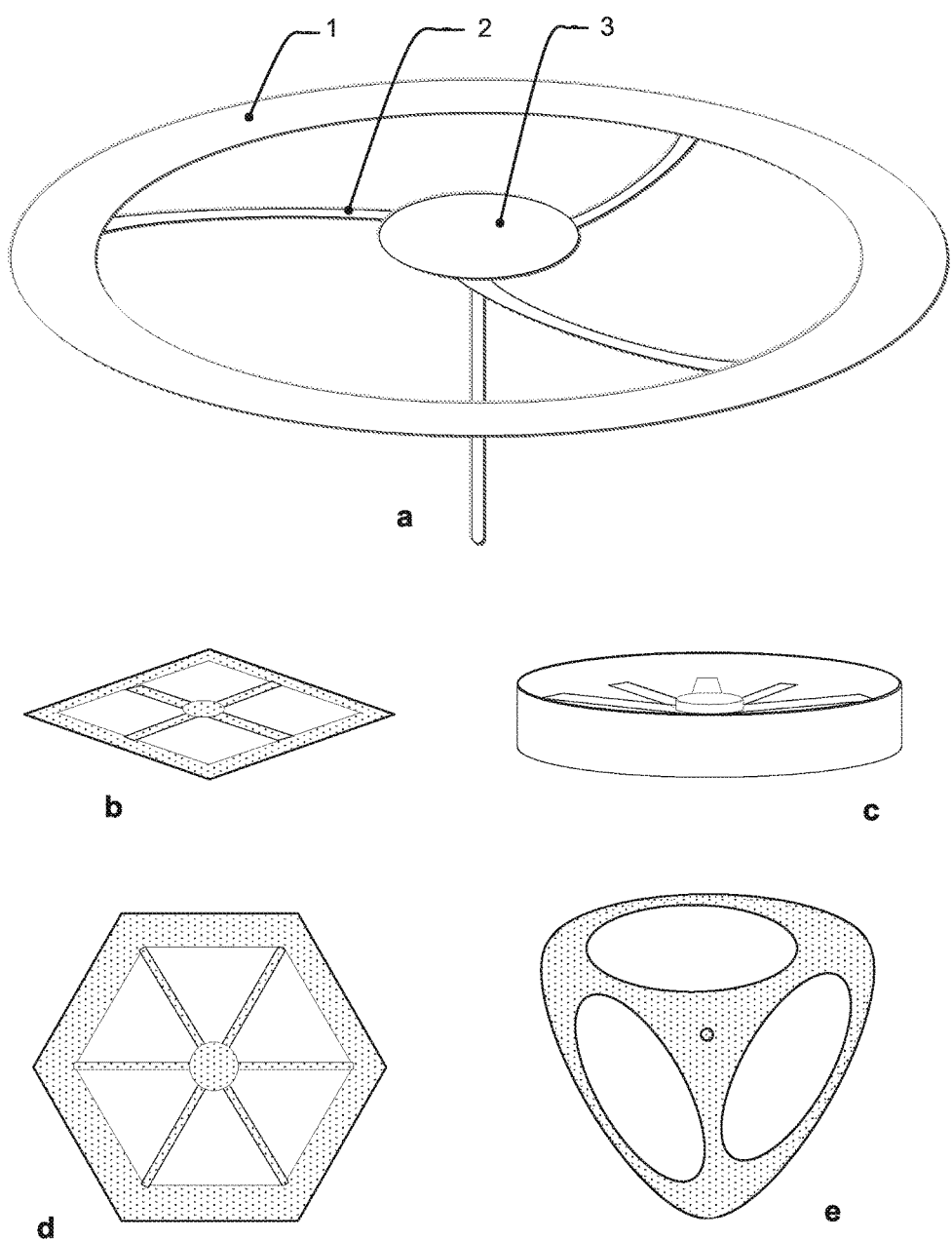

FIG. 3. Examples of the 'Air Wheel' rotor with one hub.
 a) Three-blade 'Air Wheel' rotor with an annular wing.
 b) Four-blade 'Air Wheel' rotor with a polyline closed wing profile contour.
 c) 'Air Wheel' rotor with a cylindrical wing—an impeller.
 d) Six-blade 'Air Wheel' rotor with a planar closed wing.
 e) Three-blade 'Air Wheel' rotor with an axisymmetric wing.

Figure 4:
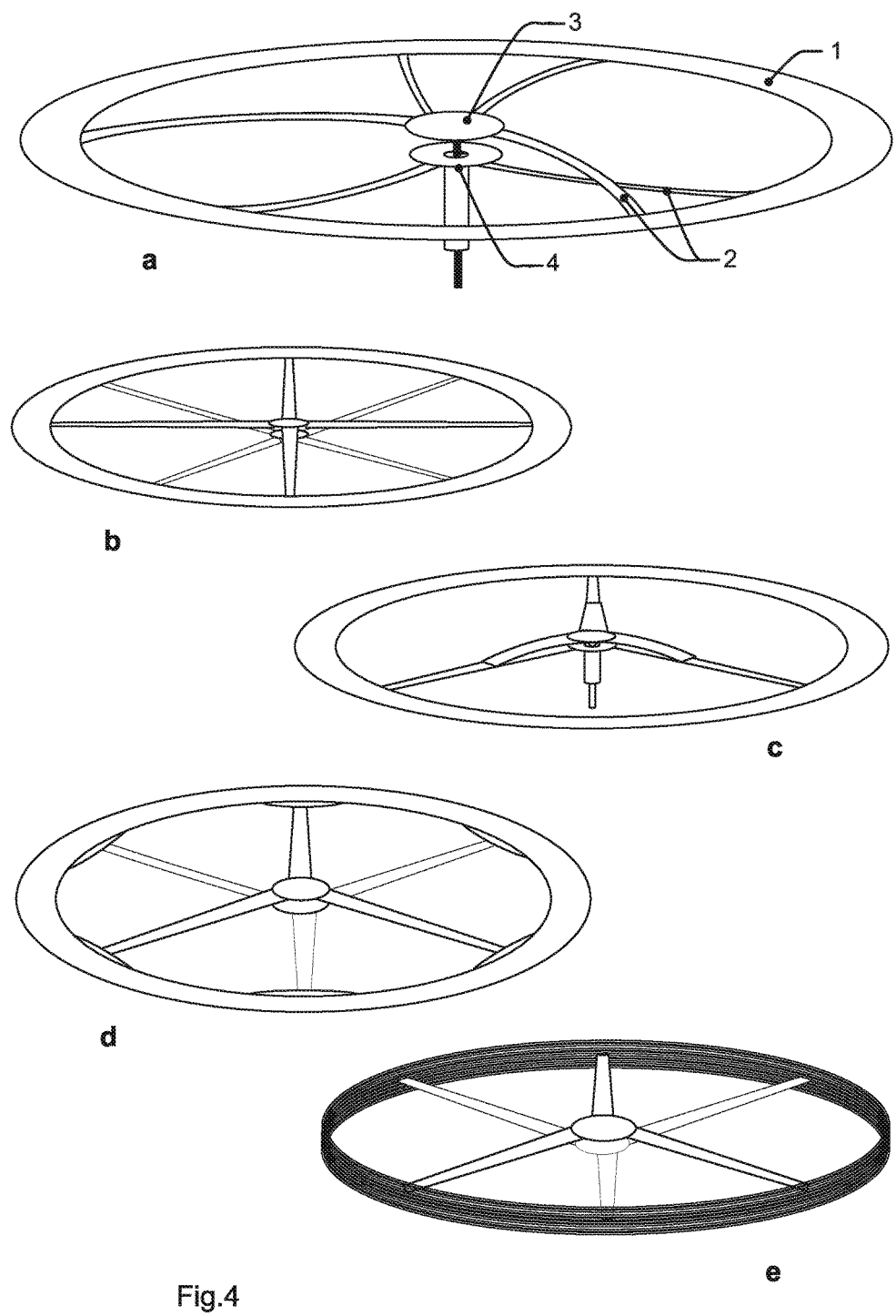

FIG. 4. Examples of the embodiments of the 'Air Wheel' rotor with two hubs (perspective views).
 a) Rigid six-blade 'Air Wheel' rotor with two hubs.
 b) Rigid eight-blade 'Air Wheel' rotor with two hubs.
 c) Nonrigid three-blade 'Air Wheel' rotor with two hubs with sliding longitudinal juncture of blades of two spaced-apart hubs.
 d) Nonrigid six-blade 'Air Wheel' rotor with two hubs with moveable elastic fastening of blade tips to the outer wing.
 e) 'Air Wheel' rotor with two hubs in a cylindrical outer wing.

Figure 5:
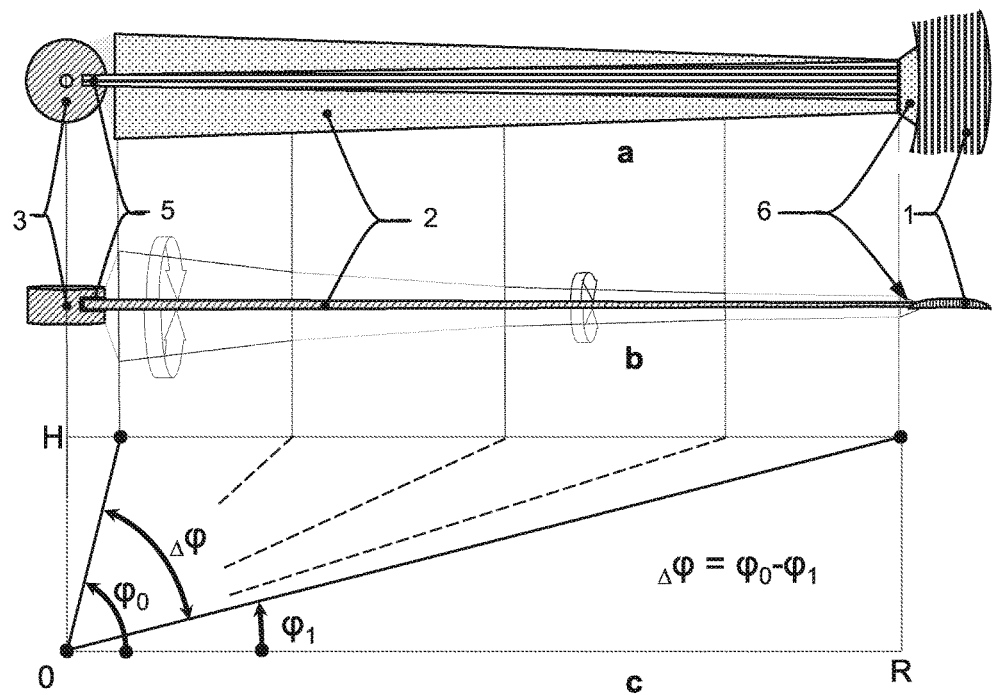

FIG. 5. Elastic torsional blade of the 'Air Wheel' rotor with variable twist.
 a) Top view.
 b) Side view.
 c) The dependence of the elastic blade section setting angle on the blade section radius.

Figure 6:
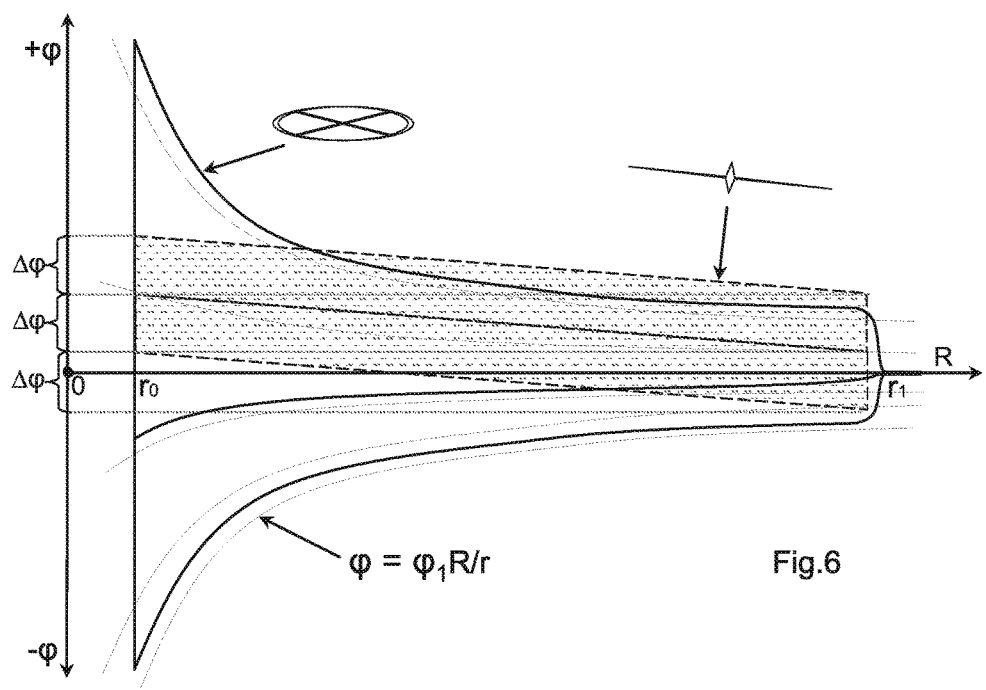

FIG. 6. Diagram of comparison of the change in the setting angles for an ideal, elastic, and rigid blade in dependence of the relative section radius.

Figures 7, 8:
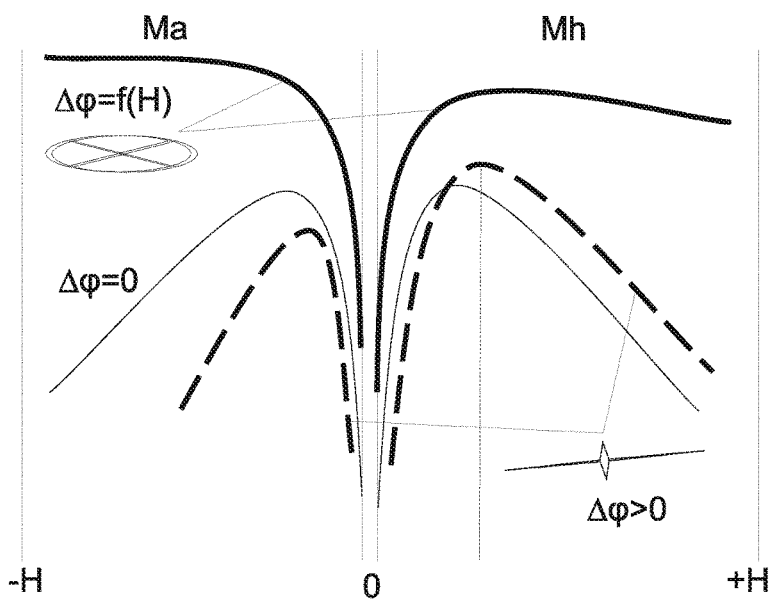

FIG. 7. Table of comparison of operation modes for an elastic blade of the 'Air Wheel' rotor and a rigid blade of the variable-pitch rotor (VPR).

Here: H max—max pitch, propeller mode;
H>0—positive pitch, helicopter mode;
H=0—minimum pitch, autorotation mode;
H<0—negative pitch, wind turbine mode.
Index 0 corresponds to a blade shank section, 1 corresponds to a blade tip section.

FIG. 8. Diagram of comparison of figures of merit of the 'Air Wheel' rotor and an ordinary rotor, the change in the relative efficiency in dependence of the rotor pitch.

Figure 9:
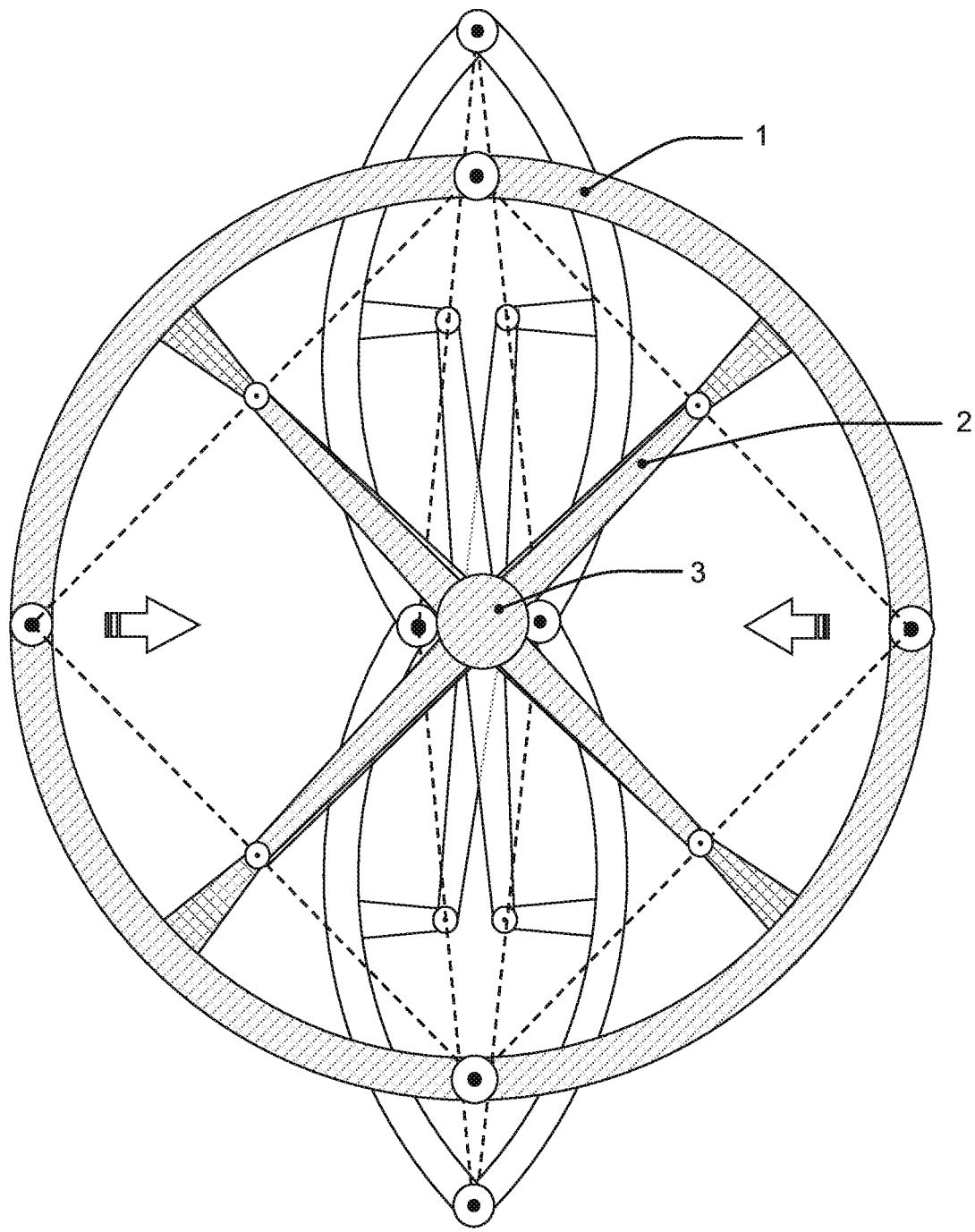

FIG. 9. Folding 'Air Wheel' rotor with four hubs.
Top view for folded and unfolded positions.

Figure 10:
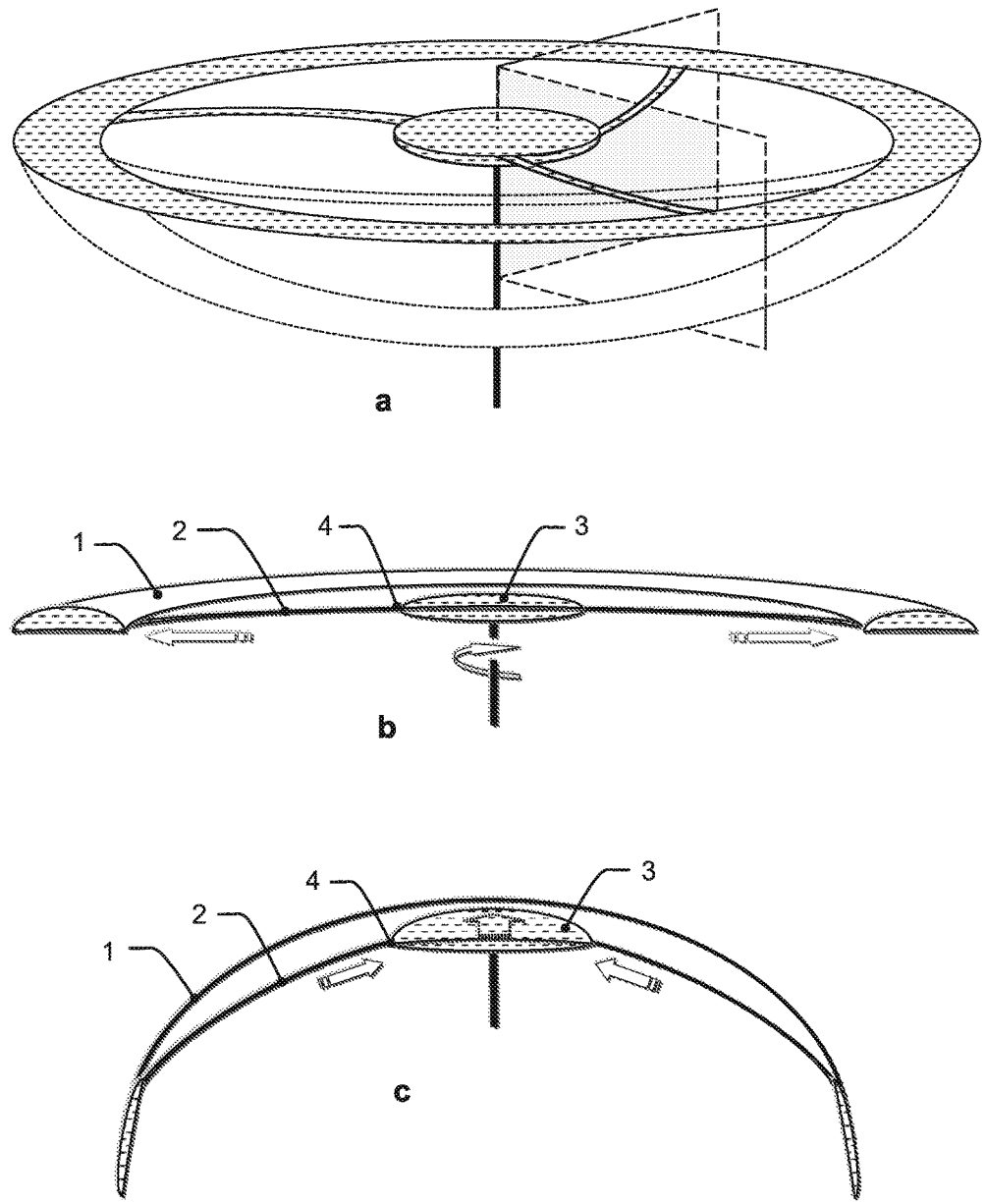

FIG. 10. Flexible hollow air-wheel with one hub.
a) General perspective view.
b) Section of the unfolded flexible 'Air Wheel' rotor.
c) Section of the folded flexible 'Air Wheel' rotor.

Figure 11:
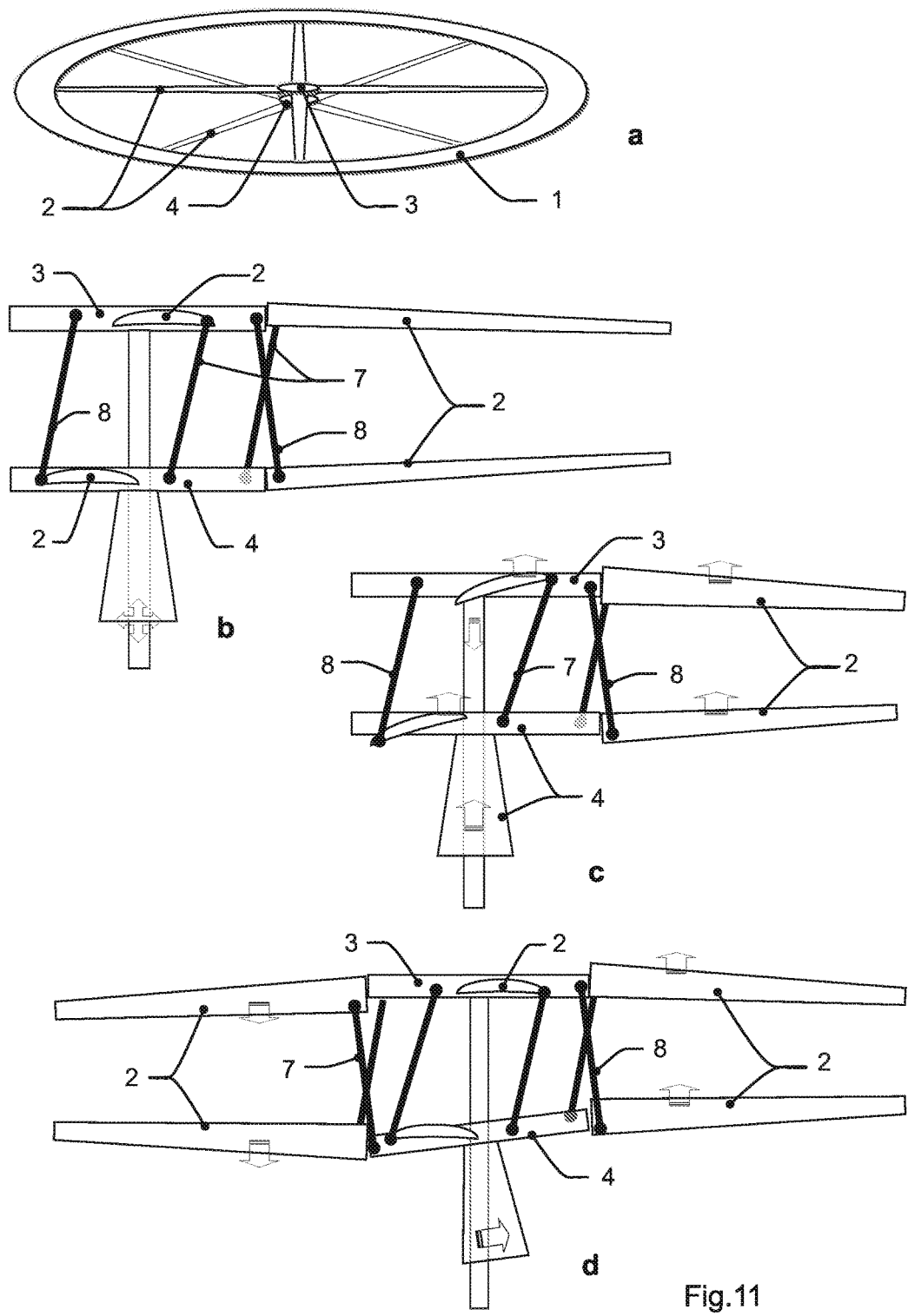

FIG. 11. Swashplate #1 of a rigid 'Air Wheel' rotor with two hubs:
a) General perspective view.
b) Initial position—pitch equal to zero.
c) Collective pitch control.
d) Cyclic pitch control.

Embodiments of a nonrigid 'Air Wheel' rotor with two hubs (top view).

Figure 12:
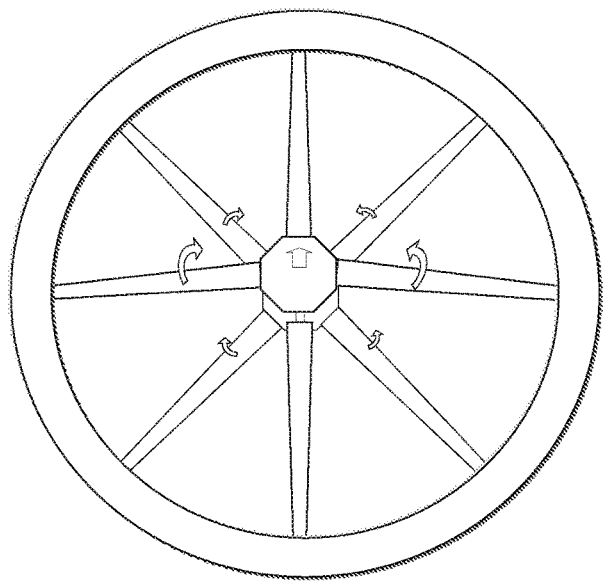

FIG. 12. Nonrigid 'Air Wheel' rotor with two hubs with moveable longitudinal axial shift of blades against a hub.

Figure 13:
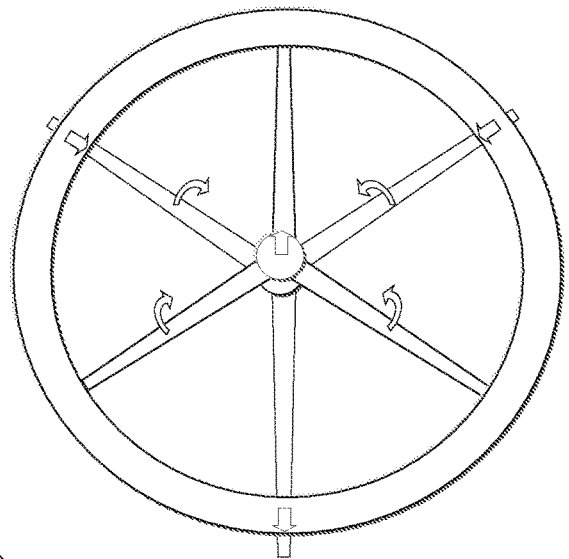

FIG. 13. Nonrigid 'Air Wheel' rotor with two hubs with sliding longitudinal fastening of blade tips to the outer wing.

Figure 14:
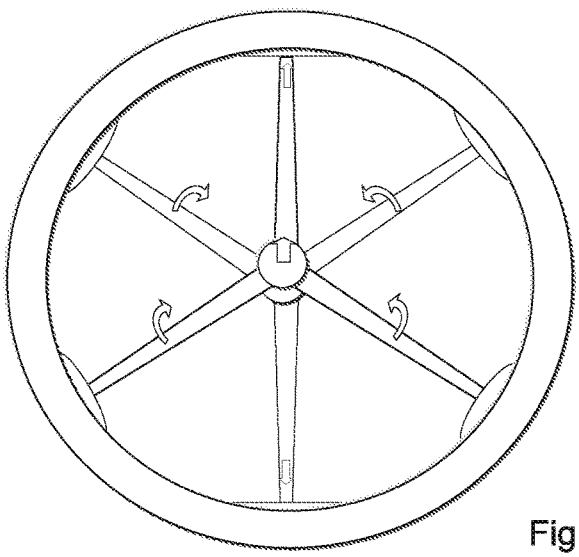

FIG. 14. Nonrigid 'Air Wheel' rotor with two hubs and moveable elastic fastening of blade tips to the outer wing.

Figure 15:
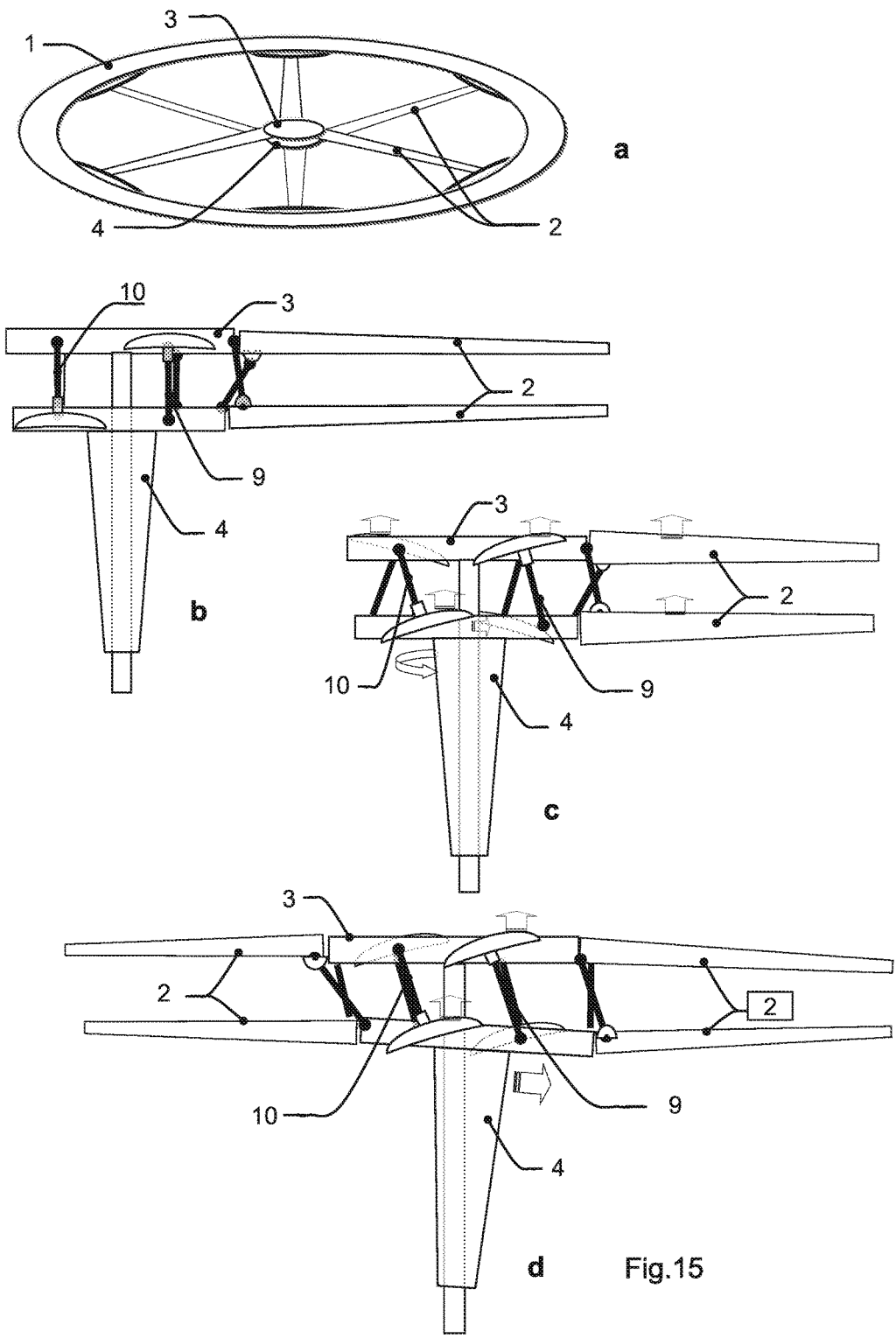

FIG. 15. Swashplate #2 of a nonrigid 'Air Wheel' rotor with two hubs:
a) General perspective view. b) Initial position—pitch equal to zero.
c) Collective pitch control. d) Cyclic pitch control.

Figure 16:
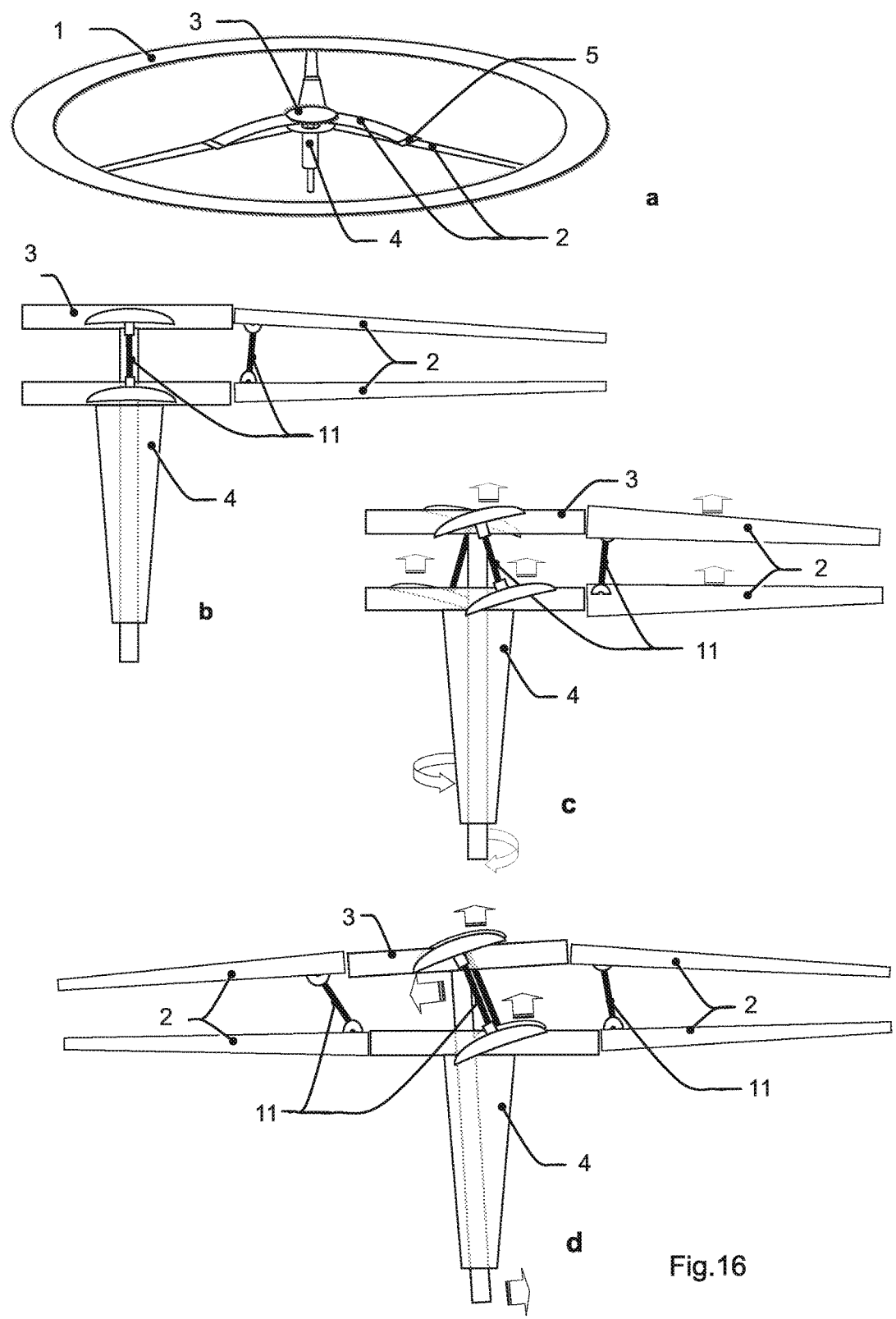

FIG. 16. Swashplate #3 of a nonrigid 'Air Wheel' rotor with sliding longitudinal juncture of blades of two spaced-apart hubs:
a) General perspective view. b) Initial position—pitch equal to zero.
c) Collective pitch control. d) Cyclic pitch control.

Application of the 'Air Wheel' rotor

Figure 17:
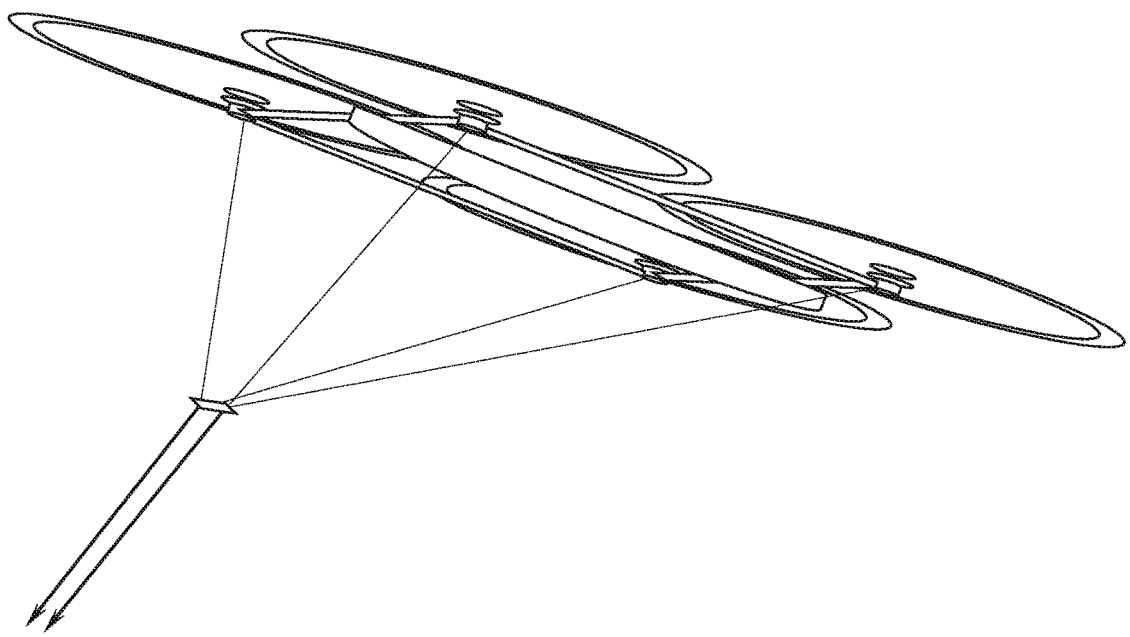

FIG. 17. High-altitude wind-driven power generator with 'Air Wheel' rotors.

Figure 18:
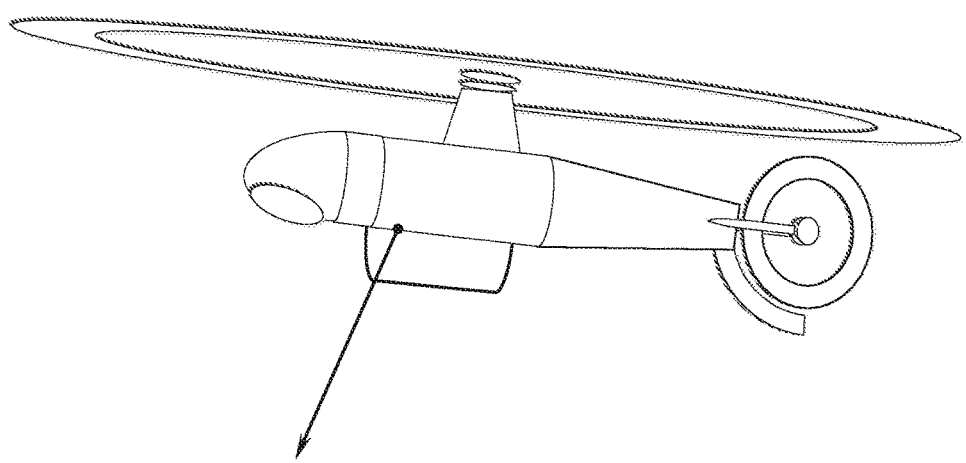

FIG. 18. Tethered altitude gyro stabilized surveillance camera.

Figure 19:
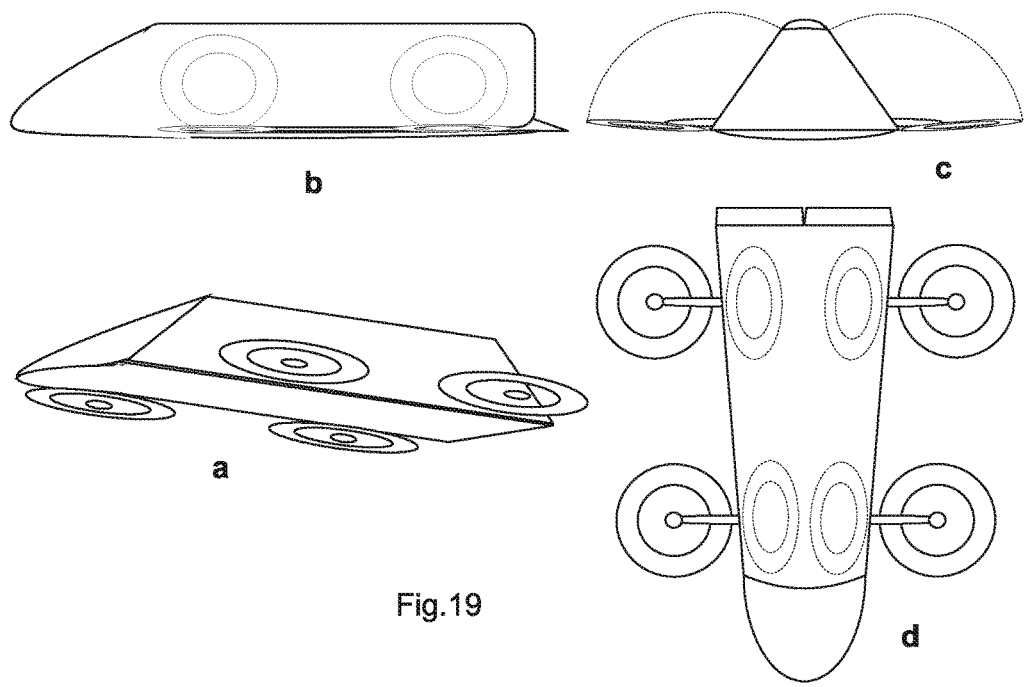

FIG. 19. Rotor system with soft vertical landing—'quadcopter'.

Figure 20:
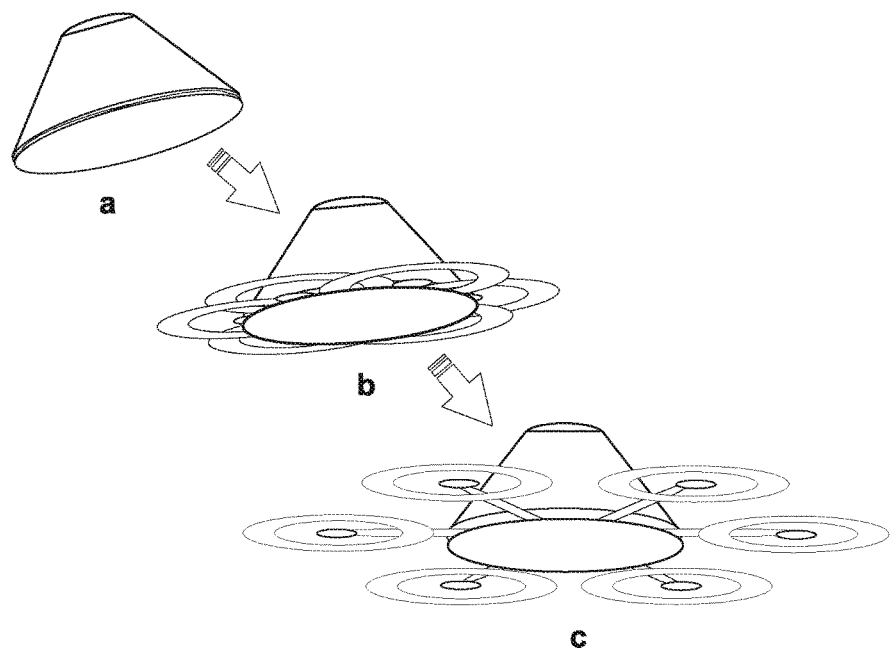

FIG. 20. Rotor system with soft vertical landing—'hexacopter'.

Gyrocraft with the lifting 'Air Wheel' rotor

Figure 21:
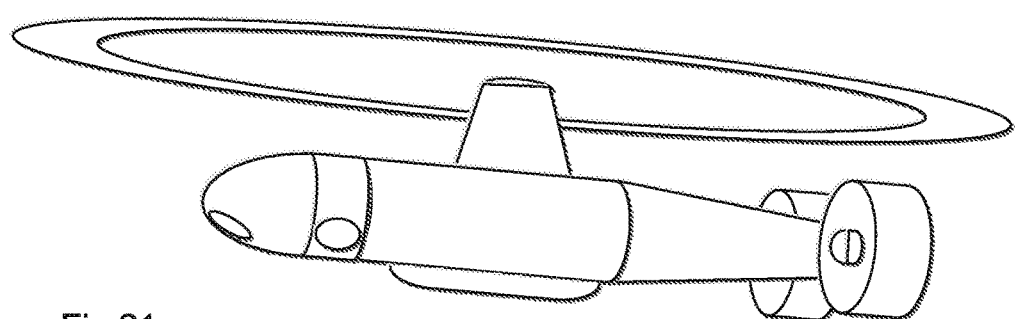

FIG. 21. Remotely controlled or unmanned gyrocraft with a cruising pusher-type propeller.

Figure 22:
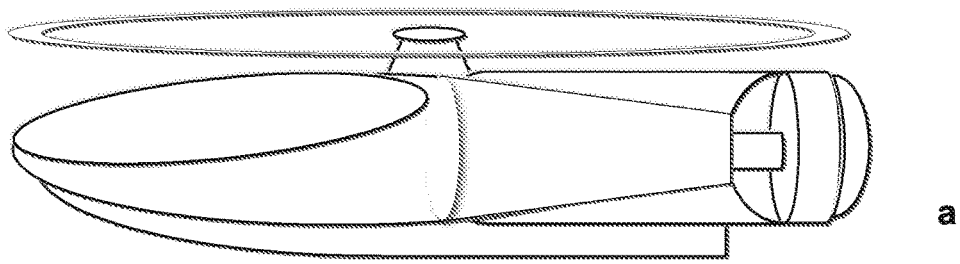
Figure 22:
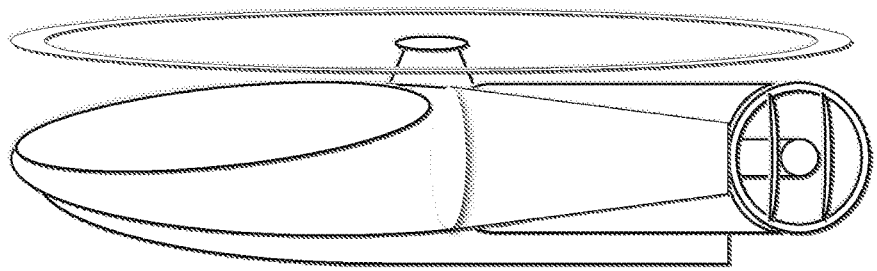

FIG. 22. Gyrocraft with a tilt cruising pusher-type propeller.
a) level flight; b) helicopter mode.

Figure 23:
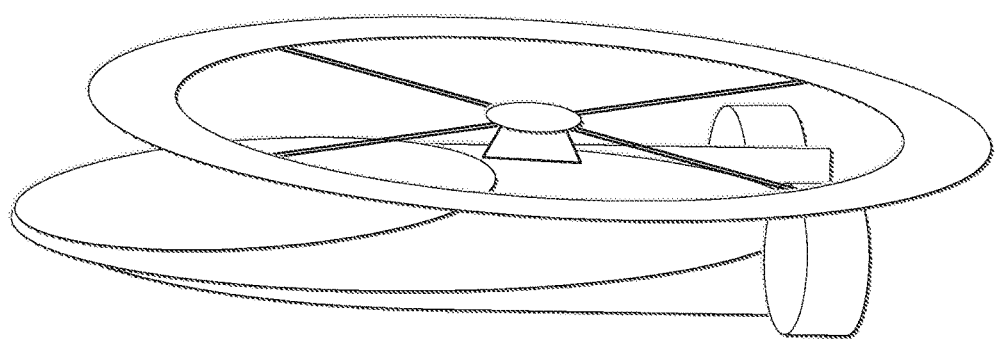

FIG. 23. Gyrocraft with two spaced-apart cruising propellers.

Figure 24:
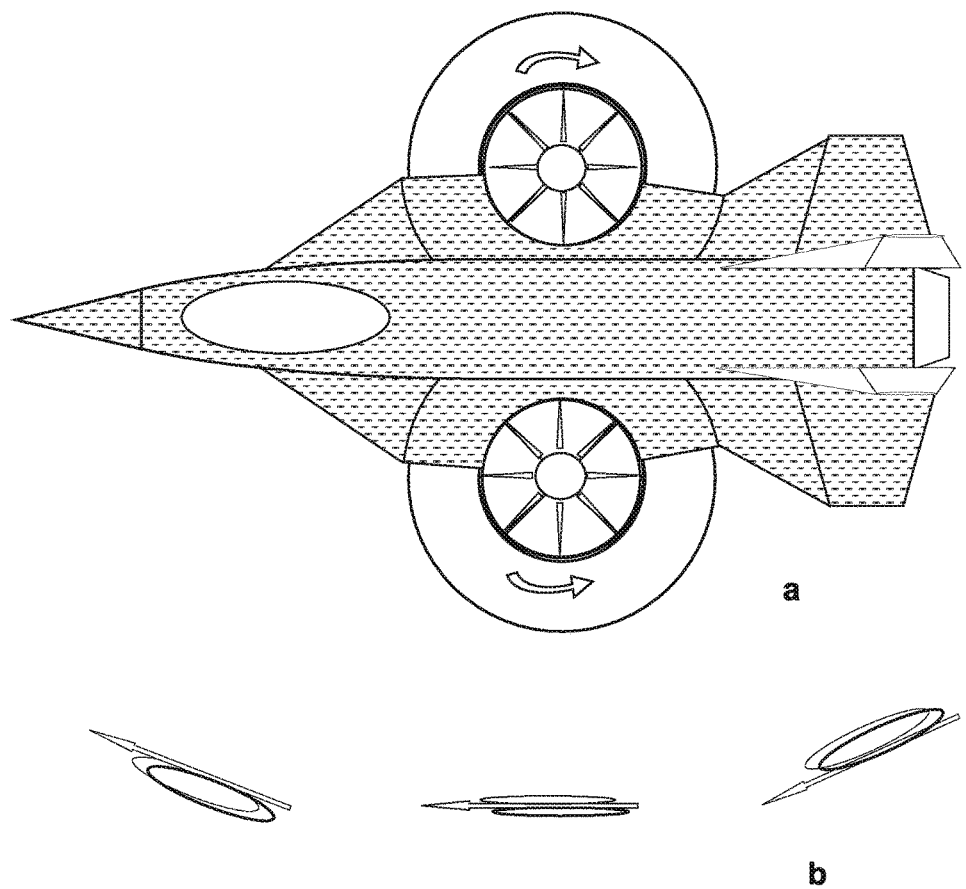

FIG. 24. Transverse rotor gyrocraft with two lifting fans:
a) top view; b) gyroscopic pitch control.

Figure 25:
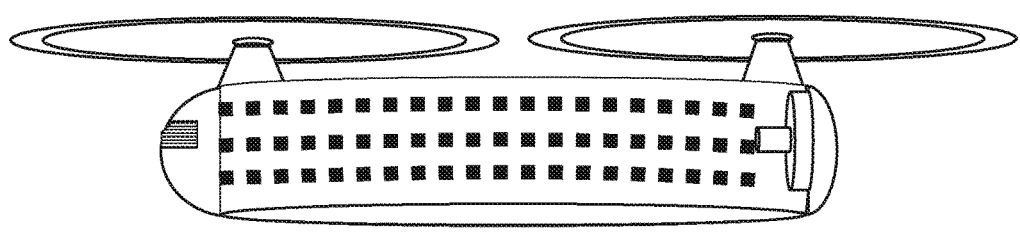

FIG. 25. Tandem-rotor configuration of a heavy gyrocraft with two 'Air Wheel' rotors.

'AIR WHEEL' ROTOR

The 'Air Wheel' rotor (see FIGS. 1, 2) comprises a planar closed wing 1, blades 2, and hubs 3. An embodiment of the 'Air Wheel' rotor comprises one hub 3 (see FIGS. 1, 2, 3). another embodiment of the 'Air Wheel' rotor comprises two hubs 3, 4 (see FIG. 4). In general, any number of hubs can be used: from one to two hubs per each blade. The 'Air Wheel' rotor can be equipped with one shaft or two coaxial shafts. The wing 1 can have a polyline profile contour or any axisymmetric shape (see FIG. 3). The planar annular wing 1 (see FIG. 3) has the minimum profile drag. The shaped wing 1 is generally planar or has a small coning angle. The shaped wing 1 connects the tips of blades 2 of the rotor and functions as:

1. A structural element providing strength to the rotor;
2. A wing creating the main lift during a high-speed flight;
3. A bulk flywheel providing energy storage and delivery;
4. A gyroscope providing aircraft stabilization.

The planar wing of the 'Air Wheel' rotor creates the main lift during a high-speed flight; therefore, the planar wing has a smaller span than a wing of an airplane. As a monolithic wing does not have a wing spar or high-lift devices, it is tension loaded by centrifugal forces and, therefore such a wing is significantly thinner than a fixed wing. The wing of the 'Air Wheel' rotor has lower profile drag and high lift-to-drag ratio at high flight speeds. A thin rotating wing has a higher rigidity, dynamic aeroelasticity, and is not subject to fluttering. The wing and blades of the 'Air Wheel' rotor can be made of various materials including heavy steel. The coning angle and complex axisymmetric shape of the wing are selected with regard to the deformations from centrifugal loads in order to reduce blade joint loads.

A hub of the 'Air Wheel' rotor does not have vertical and horizontal hinges, and the hub can be designed to have a larger diameter to increase the rotor rigidity. For this purpose, the 'Air Wheel' rotor can comprise two spaced-apart hubs (see FIG. 4 a, b, c, d, e) with blades 2 attached to different hubs 3, 4 by shanks and with their tips attached to the same closed wing 1 like spokes in a bicycle wheel. The resulting airframe is light and rigid.

In order to decrease acoustic noise, the blades of the upper and lower hubs can be phase-shifted, while having different sweeps and bends. In one embodiment, the blades have supporting struts or a shank section with Y-junctions with elastic fastening to different hubs or fastening to different hubs via a feathering hinge.

In a fully articulated rotor system, each rotor blade is attached to the rotor hub through a series of hinges. The 'Air Wheel' rotor having a rigid planform is always stabilized. In contrast to the fully articulated rotor with blade fastening via three hinges, the rotating 'Air Wheel' rotor does not produce harmful vibrations, and effects of ground resonance are eliminated. Stringent requirements on bending and torsion strength of the blades are eliminated, the loads upon the transmission and control elements are lower, and operating time and reliability are higher. Thin elastic blades 2 of the 'Air Wheel' rotor (see FIG. 5) are tension loaded like spokes with an elastic connection 6 (no swivels) to the wing 1. A torsion bar, a feathering hinge or an offset hinge 5 can be provided only for the connection between the hub 3 and blade 2 in case of great change in the pitch. Blades with a variable pitch are torsional, elastic with variable twist (see FIG. 6) and possibly with a variable profile camber.

In general, rotor design is far from being perfect and is a compromise solution seeking to meet a variety of contradictory requirements. The rotors of a helicopter and a gyroplane are similar; however, they have basically different flow directions and, consequently, different twist of blades. Therefore, while a helicopter demonstrates poor performance in a volplane mode and a gyroplane experiences difficulties during taking-off, both of them have low lift-todrag ratio and stabilization problems in case of high-speed flight. A rigid (and therefore thick) blade of any rotor can be optimized by selecting the pitch H with the maximum efficiency (0.7-0.8 with regard to the ideal propeller) corresponding to this mode. The slightest increase or decrease in the pitch H result in the increase of the losses (see FIG. 7) and still more decrease of the low efficiency (see FIG. 8).

High efficiency of the 'Air Wheel' rotor can be achieved by a number of methods.

A lower profile drag value is provided by decreasing the profile thickness, by use of non-symmetric perfect profiles, and by high surface purity of the wing and blades.

A connection 6 (without swivels) between the elastic blades 2 and the outer wing 1 allows the torsion blades to twist with variable twist angle Asp (see FIG. 5). The torsional rigidity coefficient of blades constant along the radius corresponds to a linear twist. A close approach to the ideal hyperbolic twist of the blades is possible for all modes, within a very wide range of positive and negative values of the pitch H. It is provided by a blade torsional rigidity varying along the blades with it increasing when moving from the blade shank to the tip and decreasing at the wing-blade juncture area (see FIG. 6). As the shape of the ideal blade cannot be matched to the radial rigidity distribution profile, a blade can be made of an elastic plastic material with an internal load-carrying wing spar—a shaped torsion bar or a set with varying section and rigidity (see FIGS. 5, 6).

It is to be noted that an important difference between the 'Air Wheel' rotor and an ordinary rotor consists in variability of blade pitches in a wide range of negative and positive angle values. The outer closed wing not only provides decrease in tip losses but also forms a support for the tips, thus providing a twist for torsion blades close to the ideal (see FIG. 7) and, therefore, uniform load distribution along the blade length. The maximum rotor efficiency can be achieved for all operational modes (see FIG. 8) including a propeller mode, autorotation mode and wind turbine mode with the minimum profile drag in case of high-speed flight.

At the available large angles of attack, straight thin profiles are not effective. Rigid fixed leading edge and tiltable flaps can be easily provided for tension loaded blades. A thin blade made of an elastic plastic material with several elastic wing spars having the designed rigidity can bend with varying its profile camber (see FIG. 7). Absence of drag hinges and flapping hinges provides a simpler way of attaching a blade to two or several different moveable hubs.

Lift-to-drag ratio of the rotor increases as well in case of high-speed level flight. The thin closed wing creates the main lift, provides decrease in the aerofoil drag for thin blades, reduction of blade loads, decrease in the rotor rotation speed, and elimination of the conditions causing shock-wave effects for the advancing blades and slap effects for the retreating blades. A streamline viscoelastic fastening of blades to the outer wing eliminates tips torsional vibrations and fluttering with the decrease in the level of acoustic noise and tip losses.

An example of the 'Air Wheel' rotor is represented by a lifting shrouded fan (see FIG. 2). The wing section is close to the shape of a disk with uniform strength distribution and has almost triangle profile: a sharp or rounded thin outer edge and a wider inner edge. Short blades can be rigid with a variable or fixed pitch. There can be several blade-to-hub and blade-to-outer wing attachment planes. A rigid blade with a variable pitch has a controlled flap or runs as a whole upon the axis (a spoke-torsion bar) connecting the hub with the wing. The thrust of the rotor with rigid fixed blades can be controlled by means of a controlled guide vane. The thrust direction can be controlled by means of body flaps.

The 'Air Wheel' rotor can accommodate fuel, accumulator batteries, engines, propulsive nozzles, solar array panels, sensors, antennas, balancers, indicator lights, anti-icing systems, and other equipment and body components.

While the 'Air Wheel' rotor has a large fixed size, disassemblable and folding modifications are contemplated (see FIG. 9). This problem is solved by use of an elastic planar 'Air Wheel' rotor (see FIG. 10a) which can be folded on the ground. The rotor gets the required rigidity dynamically when rotating. The 'Air Wheel' rotor rigidity can be further increased by injecting gas or liquid into the hollow wing internal volume (see FIG. 10b). During rotor rotation, liquid from the tank located along the shaft channel or from the vessel 3 arranged at the hub is supplied through valves 4 and channels 2 to the wing 1 under high centrifugal pressure. Valves 4 ensure high rigidity of the 'Air Wheel' rotor at any rotation speeds during the flight. A ground controlled relief valve 4 is used to deflate the rotor and restore its flexibility (see FIG. 10c). In the embodiment of the wheel with two hubs, rigidity increases when the hubs are spaced apart.

The rotor blades can have crescent shape (see FIG. 3a) or a feathering hinge with an offset hinge axis located in the rotation plane forming an angle with the blade axis that allows automated stabilization of the rotor rotation plane position against the shaft position. Blade tip lowering results in an increased angle of attack, while its elevation results in a decreased angle of attack. As the result, the hub and rotor shaft are less loaded.

Swashplates

Rotor collective and cyclic pitches are controlled by a swashplate. Different swashplate designs include annular (dish-shaped), 'spider', crank types, etc. Almost all of the existing swashplate types can be employed for the 'Air Wheel' rotor. For 'Air Wheel' rotors with two hubs (see FIG. 4), new swashplate modifications can be used along with the existing ones. The new modifications are intended for controlling the blade collective and cyclic angles of attack without use of outer rods but only by controlling positions of the two spaced-apart hubs (see FIGS. 11, 15, 16), e.g.: Embodiment of a Swashplate #1. Control of the Rigid 'Air Wheel' Rotor Pitch (See FIG. 11).

In the 'Air Wheel' rotor with two hubs, each blade 2 is attached to the hub with a feathering hinge or elastic connection (not shown) and has rods 5, 6, which are attached not to the outer controls but to adjacent hub 2 or 3. For example (see FIG. 11b), if articulated rods 7 connect the front part of an upper hub blade to the lower hub 4, and rods 8 connect the rear part of a lower hub blade to the upper hub 3, then the angle of attack of blades 2 and, consequently the collective (see FIG. 11c) and cyclic (see FIG. 11d) rotor pitches, are controlled by the positions of the hubs. Pitch horns are close to the blade plane. This embodiment is similar to the conventional dish-shaped swashplate of Yuriyev and operates in the same way.

Relative angular orientation of moveable hubs can be used for controlling the collective pitch and can be fixed by means of a spline coupling, intermediary junction, or another connection. For spacing the hubs apart in the blade pitch control system springs, a hydraulic or electrical drives can be employed.

Pitch control can be provided for an elastic torsion blade or its part, for example, an elastic or jointed flap at fixed position of the leading edge flap of a blade. Thus, the control of thin elastic blade profile camber is performed. By tilting the flap a larger shift for blade cyclic pitch feed-forward control can be provided.

The 'Air Wheel' rotor with two hubs can be nonrigid.

For example:

Blade shank fastening to a hub with longitudinal axial shift of blades against a hub (see FIG. 12).

The 'Air Wheel' rotor with sliding longitudinal fastening of blade tips to the outer wing (see FIG. 13).

The 'Air Wheel' rotor with moveable elastic fastening of blade tips to the outer wing (see FIG. 14). The embodiment with the least effects of wing deformation caused by centrifugal loads.

Telescopic blades, etc.

Moveable blade fastening reduces rigidity of the 'Air Wheel' rotor that allows blade cyclic pitch feed-forward control performed via tilting the shaft against the perpendicular to the wing plane.

Embodiment of a swashplate #2. Control of the pitch of the nonrigid 'Air Wheel' rotor with two hubs (see FIG. 15).

This embodiment is similar to the first one, but (see FIG. 15) pitch horns 9 and 10 are in general perpendicular to the planes of blades 2. Rods 9 and 10 can have two degrees of freedom in the connection with a hub and only one degree of freedom in the connection with a blade: free tilt—along the blade, rotation—together with the blade in the feathering hinge. Rods can be telescopic and tilted. Shifting hubs 3, 4 in the direction perpendicular to the blade axes leads to the change in the angle of attack. Longitudinal shift is typical for different sliding fastening modifications. The collective pitch is controlled by setting the relative angular orientation of the hubs against the rotation axis (see FIG. 15), and the cyclic pitch is controlled via setting the horizontal shift of the hubs (see FIG. 15) by spacing the hub axes apart.

Embodiment of a swashplate #3. For a nonrigid 'Air Wheel' rotor (see FIG. 16a) with sliding longitudinal juncture 5 of two blades 2 of two spaced-apart hubs 3 and 4 the number of rods can be reduced two times in case of blade fastening directly by means of pitch horns 11 (see FIG. 16 b, c, d).

Rotor cycle pitch sets a tilt of the shaft and/or relative horizontal shift of the hubs (see FIGS. 11d, 15d, 16d).

Rotor collective pitch control is performed by setting the angular orientation of the hubs. Relative spin displacement and phase lag of the upper hub against the lower increase the angle of attack of all the blades and the rotor pitch (see FIGS. 11c, 15c, 16c). Alternatively, phase lead of the upper hub against the phase of the lower one decreases the pitch.

The angular orientation of different hubs of the 'Air Wheel' rotor is transmitted to long elastic blades being quite elastic even in case of rigid wheels. Compensating springs and elastic joints can be employed to allow hub tilting.

The collective pitch of main lift rotors and cruising rotors of the 'Air Wheel' rotor type can be easily controlled by setting the angular orientation of the hubs via drives of the coaxial shafts. In this case, a large torque transmitted to the lower hub increases the collective pitch (FIG. 15d, 16d) with the change of the rotor operation mode from an autorotation mode to a helicopter mode. Alternatively, lower hub deceleration or a large torque transmitted to the upper hub change the rotor operation mode to a wind turbine mode. Simultaneous torque transmission to both hubs provides 'Air Wheel' rotor acceleration with zero pitch and minimum drag.

Embodiment of a swashplate #4. Automated control of the rotor cyclic pitch and rotation plane without implementation of any auxiliary elements using blades with a feathering hinge with an offset hinge axis can be provided. In case of the 'Air Wheel' rotor with two hubs, a feathering hinge intended for attaching a blade to the hub tilted against the rotation plane provides control of the blade angles of attack via setting a spin displacement of shift of the hubs without the use of any special pitch horns and rods (see FIGS. 12, 13, 14). In this case, a pitch horn is represented by the outer blade tip offset against the feathering axis.

Applications

The provided 'Air Wheel' rotor having a closed wing with a large coning angle can be widely used as a cruising propeller (impeller) or the rotor of a wind turbine. In water, such a wheel operates as a marine propeller with a low level of noise or as a robust hydro-turbine rotor.

For example: the 'Air Wheel' rotor with a cylindrical wing and a horizontal shaft can be employed for a wind-driven power generator. In this embodiment, the rim allows the increase of the rotor diameter and specific power output with a decrease in the level of noise, weight, and cost of the wind-driven power generator. As the rotor of an electric generator, the closed wing provides elimination of a gearbox and allows the movement of a heavy stator of an electric generator from the tower to ground. The controlled blades provide simpler launching and maintaining of a stable rotation rate regardless of the load and wind strength.

The provided 'Air Wheel' rotor having a closed wing with a small coning angle is most effective as the rotor operating in an autorotation mode.

For example, the 'Air Wheel' rotor can be used as the rotor of a tethered high-altitude wind-driven power generator (see FIG. 17). The 'Air Wheel' rotor provides the following advantages:

An option for increasing the rotor diameter and specific power output.

Higher efficiency, flight altitude, performance, operating time, and reliability.

Wider range of allowable wind strength.

All-weather capability.

A lower level of acoustic noise.

High stability of current parameters at wind blasts.

Fly-wheel platform stabilization.

Reliable vertical take-off and soft vertical landing.

A lower cont of the rotor and wind-driven power generator.

The closed wing can operate as the rotor of a motor-generator that results in the elimination of mechanical gearboxes and system weight reduction.

High lift-to-drag ratio of the lifting 'Air Wheel' rotor with a narrow closed high-aspect wing allows the creation of an aircraft without a power unit—a gyroglider. A gyroglider can be tethered or free-flying, microscopic or ultraheavy.

A remotely controlled gyroglider (see FIG. 18) has two rotors: a lifting rotor and a control rotor, which are reliably gyro-stabilized in two planes. It is launched by means of a ground launching device designed for initial rotor acceleration with an external power supply system or onboard accumulator batteries. When at the flight height, it receives power supply from the auto rotating 'Air Wheel' rotor, transmits data and receives control signals via a long light optical fiber cable. A high-speed reliable communication channel is fully secure. The dielectric optical fiber cable is not subjected to atmospheric disturbances. An all-weather capable, silent-running, remotely controlled aircraft is maximally simple and reliable; it does not require any operation; and it automatically follows a mobile user, vehicle, or vessel. It does not have any problems concerned with returning and landing. There are no limitations of the availability time of such a drone for communication and/or surveillance being at a flight height where there is no extended dead calm.

Use of the 'Air Wheel' rotor as a rotochute ('rotor parachute')—an umbrella-less system for landing the modules of space vehicles (see FIGS. 19, 20) and air-dropped cargoes, has obvious advantages over other atmosphere landing systems:

Options for maneuvering and accurate spot landing.
All-weather capability and reliable soft landing. Simplification of the control system by fly-wheel control of a descent vehicle.
Minimum weight and portability at high rotor loading.

The 'Air Wheel' rotor can be widely used as a rotor of a type of vertical take-off and landing (VTOL) gyro-stabilized aircraft, which is referred to in this document as a gyrocraft.

Gyrocraft

A gyrocraft is a VTOL-type aircraft, a sort of rotor-winged aircraft ('compound helicopter'). In gyrocraft, the united lifting and cruising system (for a helicopter) is replaced by the following two systems: the first system is represented by the lifting rotor intended only for providing lift, and the second system is cruising system for moving forward (see FIGS. 21-15). During taking-off, landing, and flying at low speeds, the lift is created by the blades of the 'Air Wheel' rotor. In the case of high-speed level flight, the main lift is created by the wing that is not straight and fixed but rotating and closed.

In general, the gyrocraft comprises:
One or more 'Air Wheel' rotors operating as a lifting rotor or a shrouded fan.
A streamline lifting fuselage with developed side surface.
A power unit with a fixed drive for one or more cruising propellers and a connectable drive for the 'Air Wheel' rotor.
Controlled vertical and horizontal tails.
A landing device: wheeled landing gear or a landing skid, balloons, etc.

The rotation shaft of the 'Air Wheel' rotor is arranged vertically and attached to the fuselage (frame) via bearings. Gyrocraft heading control is performed by means of a rudder in the cruising propeller flow (see FIG. 22a), a tilt cruising propeller (see FIG. 22b), or a pair of spaced-apart cruising propellers (see FIG. 23). Tilts are followed by aerodynamic skidding at the fuselage developed side profile.

The motor is directly (or via a small reduction gearbox) connected with the cruising propeller and as well has a connectable drive (a mechanical variable speed drive, hydraulic drive, electric drive, jet drive) for accelerating the 'Air Wheel' rotor. The gyrocraft power unit, in general, comprises:

an electrical drive—for an ultralight electrical gyrocraft;
a reciprocating motor—for light and efficient gyrocraft;
a gas-turbine engine—for heavy and high-speed VTOL-type aircraft;
a hybrid drive with different drives for a cruising and a lifting propellers.

For the electrical gyrocraft, accumulator batteries or fuel cells can be readily accommodated on the 'Air Wheel' rotor wing. This reduces weight of the aircraft, increases the accumulator battery specific capacity by 45 kJ/kg, provides sufficient cooling and protects the lifting rotor from icing.

For a rigid 'Air Wheel' rotor, a direct electrical drive for a bulk wing can be used without employing mid-shafts and gearboxes. Such a drive type is most effective for a tandem-rotor configuration with two rotors, small and ultra heavy gyrocraft.

An 'Air Wheel' rotor jet drive with a high noise level can be used. Compressed air is supplied from the compressor through hollow shaft and blades to propulsive nozzles or combustion chambers at the rotor outer side.

The closed wing of the rotor can be used for storage of fuel (liquefied petroleum gas). Storage of liquid fuel in the wing internal volume results in problems concerned with fuel retrieval. It is applicable in case of rotor stopping, or placing fuel cells in the same location, or application of a jet drive with fuel afterburning.

At low flight speeds, lift and controllability are provided better by a propeller, while at high flight speeds a wing is more effective. Depending on the relative wing width, the 'Air Wheel' rotor is more similar to a rotor (see FIG. 1) or a wing (see FIG. 2), and, consequently, the gyrocraft is more similar to rotor-winged aircraft or planes. The space factor defined as the ratio of the rotor surface area to the disk area, ratio of the internal diameter to external, or closed wing aspect ratio can be employed as a 'similarity indicator'. Let us discuss the extreme modifications.

A thin rim forms a wing with the maximum aspect ratio that fits light low-capacity gyrocraft. The rim encompasses the loads, increases the lifting rotor strength, safety, reliability, and operating time. The rotor lift-to-drag ratio and maximum design speed are increased. The light wing does not affect the maneuvering ability; control is provided without the use of a swashplate directly by setting the title of the rotor rotation plane. The light wing allows the gyrocraft to perform jump take-off, and a bulkier wing allows it to perform fully vertical launching. The lift-off height is proportional to the relative flywheel weight.

By increasing the relative wing width to the maximum value, the 'Air Wheel' rotor can be transformed into a planar disk-shaped rotating wing with an internal fan (see FIG. 2) that is the most optimal modification for high-speed vertical take-off and landing planes. A high-speed gyrocraft with transverse configuration with two fans located close to center of mass (see FIG. 24) can be provided in a similar way. The linear speed of fan blades is limited by the sound velocity, while the linear speed of the disk outer side can be many times higher being limited by the material strength only. In this case, the wing is formed by a winding of metal wire, strips, or composite nonmetallic fiber materials. The use of Kevlar and graphite-fiber allows obtaining the speed equal to 1000 m/s or higher. At high speeds, rotor kinetic heating should be taken into account.

High amount of stored energy and available power provide quick vertical take-off performed by means of a small fan. The rotating rotor provides reliable longitudinal and lateral fly-wheel control for the aircraft during take-off and landing without implementation of any complex control and stabilization systems. Thrust control is performed via fan blade pitch control and\or by means of a moveable guide vane. Cold flow does not cause burning of a site or board. After take-off, the rotor can be stopped and fixed in order to increase maneuverability. Prior to landing, the rotor is again accelerated via the approach flow and engine. In the case of autorotation and the use of a jet rotor drive, the anti-torque moment is not generated, while in the case of mechanical acceleration during the flight, it is compensated by means of the stabilization system and via cruising propeller thrust vectoring control. Full suppression of the anti-torque moment is provided by the use of two contra-rotating rotors laid out as tandem (see FIG. 25), transverse (see FIG. 24), or coaxial.

The 'Air Wheel' rotor is a universal element for VTOL-type aircraft from motorless gyrogliders to jet supersonic planes that can be scaled for small electrical drones and ultraheavy multi-rotor transport gyrocraft.

The theoretical load-lifting capacity limit for one-rotor helicopters is about 35 tons; for a MI-26-type helicopter, the actual value is equal to 25 tons. The first limiting factor is the diameter of the lifting rotor because long blades trail to the ground and tail boom. The second limiting factor is limited power of the gearbox and engines in the united power unit. The 'Air Wheel' rotor does not have such constraints and, therefore, can provide the load-lifting capacity over 100 tons per a single rotor. The two gyrocraft rotors can be laid out as tandem, transverse, or coaxial. For the modifications with multiple spaced-apart rotors, the 'Air Wheel' rotors do not require high-performance synchronize shafts, the required gearbox power is lower, and the distributed power system is simpler (see FIG. 25). Mechanical gearboxes and transmissions conventionally employed for aircraft can be eliminated via using a directly-acting electromagnetic drive for the 'Air Wheel' rotor wing.

Ground Launching Device

Take-off is the most energy-consuming flight stage for each aircraft. Horizontal plane takeoff is preceded by take-off acceleration produced by moving along a long takeoff field. Vertical gyrocraft takeoff is preceded by acceleration of its bulk rotor. It is much simpler and safer but also energy-consuming. The 'Air Wheel' rotor stores a large amount of energy in a wide rotation speed range.

The minimum amount of energy required for flywheel acceleration to a speed of 300 m/s is 1 kWh (3.6 MJ) per each 80 kg of the weight (without regard to loses). This work can be done by an engine of 60 kW in a minute; however, the longer acceleration time results in higher aerodynamic losses. Quick transmission of this energy to the 'Air Wheel' rotor requires a high-performance mechanical or hydraulic variable speed drive, transmission, or high-performance electric motor.

It is necessary not only to hasten take-off, save fuel, and increase gearbox operating time, but it is also important to decrease the take-off noise level. A ground, i.e. stationary, launching device provides quick and silent acceleration of a bulk rotor. Such a device is required for launching motorless gyrogliders. The external ground/onboard launching device is intended for energy storage, conversion, and transmitting to the 'Air Wheel' rotor.

Dedicated sites within population aggregates and towns are usually provided with a universal power source—a power line. An energy storage system is intended for smoothing large peak loads. Any modifications of a ground (onboard) launching device can be provided. Depending on the selected energy storage method, it can be mechanical, hydropneumatic, electrical, etc. For example:

Electrical motor-flywheel-variable speed drive-gyrocraft;
Electrical hydraulic pump-hydropneumatic storage unit-hydraulic motor-gyrocraft;
Charging system-capacitors-converter-one or more high-performance electrical motors-gyrocraft.

The 'Air Wheel' rotor acceleration can be provided without the use of shafts and gearboxes directly via a travelling magnetic field generated by a linear motor. In this case the closed wing operates as the rotor of an electrical motor.

Gyrocraft with jet rotor drives can be launched via a pneumatic storage system. Light gyrocraft can be launched manually.

The ground/onboard launching device can be equipped with a control system and charge and speed detectors. It is applicable for moving a gyrocraft on the ground, preflight and postflight maintenance, cleaning, monitoring, balancing, anti-icing treatment, rotor heating, etc.

Vertical Take-Off

Standard vertical take-off can be evolved into efficient, all-weather capable, reliable, safe, quick, and silent vertical take-off. This is the very take-off provided by means of the 'Air Wheel' rotor. Gyrocraft take-off requires neither a take-off field nor a high-performance gas-turbine engine. An inertial drive does not generate anti-torque moment and, therefore, a control rotor causing hazardous situations and high-frequency vibrations is not required. The 'Air Wheel' rotor is a high-performance kinetic storage device that does not produce vibrations and noise by contrast with a rotor. At the operation stage prior to take-off, the pitch of thin blades is set to zero with their twist equal to zero resulting in minimal energy loss and noise level. The wing prevents blades from trailing to the ground during parking and blade tails slapping during rotation.

Prior acceleration of the 'Air Wheel' rotor is performed on the ground and can be provided via free-running acceleration by means of either the gyrocraft power unit or an external power supply system. The optimal is the implementation of a fly ground (onboard) launching device. Such a launching method is efficient and so silent that it allows the gyrocraft to be used within towns. Only some types of aerostatic balloons can take-off more silently than the gyrocraft.

In case of free-running take-off, the gyrocraft power unit engine of 100 kW provides acceleration of a 100 kg rotor in less than a minute. The anti-torque moment is taken by landing gear or skids. The initial acceleration can be performed until achieving high linear speeds $u_0$=300 m/s at light speeds $u_1$=100 m/s. Thin blades with the appropriate twin angle have uniformly distributed loads and high efficiency η of minimum 0.75. Providing the relative flywheel mass about 10% of the take-off weight M=1000 kg the amount of stored energy is sufficient for quick vertical take-off to a high altitude without further implementation of the engine and transmission:

$$H=\eta(u_0^2-u_1^2)m/2\ Mg=0.75(300^2-100^2)/200=200\ \text{meters.}$$

Non-optimal take-off rates lead to the increase in circulation and drag losses, and the actual altitude can be lower but still sufficient for reliable take-off in urban terrain.

The gyrocraft has a one more unique feature. Besides acceleration of a center flywheel, acceleration of several tons of air flow also can be performed. The mass of an air cube 10 m*10 m*10 m is more than a ton (m=1249 kg, t=15° C., H=0). Prior to being launched, the 'Air Wheel' rotor can generate a strong updraught of air overheated at the ground, which is energy that can be used to assist in take-off. The lift-off height, climb performance, and vertical load factor increase.

During the take-off stage, power generated by the 'Air Wheel' rotor is neither limited by the engine performance nor by the gearbox and transmission reliability. The total amount of energy required for take-off is stored by the rotor on ground. The available take-off power is many times more than that of the power unit. This unique gyrocraft feature option for engineless take-off allows wide implementation of silent electrical power units and efficient fuel cells.

Gyrocraft is a stabilized all-weather aircraft. All-weather capability is provided not only by high available power and climb performance. As in case of a powered gyroscope, the initial rotation plane of an accelerated 'Air Wheel' rotor remains unaffected. It is not significantly influenced by atmospheric turbulence and wind blasts. There are no problems with gyrocraft take-off under adverse conditions: storm and hot weather, high mountains and unprepared dusty sites.

There are no complex take-off transition modes. While on the ground, the engine is switched to the cruising rotor, with all its power used only for achievement of the horizontal cruise speed. In the case of low-sloped take-off from the roof of a building, the extra amount of energy of the lifting rotor can be used.

Thus, the gyrocraft can perform quick, reliable, and silent altitude gain and level flight speed under any weather conditions.

Stable Horizontal Flight

The gyrocraft demonstrates unique stability for all flight modes. The 'Air Wheel' rotor rotation plane orientation is kept so as to provide a small positive angle of attack. During horizontal flight, the 'Air Wheel' rotor operates as a planar wing with its blades unloaded and acting as control planes; the collective pitch is close to zero; and the optimal angle of attack value is provided via the cyclic pitch and tail. The variable cyclic pitch provides control capability in case of low flight speeds. Heading control is performed by means of a rudder and via thrust vectoring control with external aerodynamic skidding at the developed side surface.

Rotor rotation provides a tension loaded profile thus providing sufficient rigidity and dynamic aeroelasticity of the thin wing. The 'Air Wheel' rotor rotation is maintained partially by means of autorotation and partially by the engine; so its design is close to that for a gyroplane (autogyro) and for a compound helicopter with the wing and cruising rotors. An inertial drive and autorotation do not generate anti-torque moment and, therefore, a control rotor, long tail boom, and complex transmission are not required. Low constant anti-torque moment of twisting the 'Air Wheel' rotor by the engine is compensated via the rudder, or by thrust vector offsetting, or via thrust distribution over spaced-apart cruising rotors.

Full acceleration time for a gas-turbine engine is 8-15 seconds, thus limiting the maneuvering ability of a helicopter. The gyrocraft has prompt full acceleration and high rotor power that are not affected by the performance of the power unit. The gyrocraft has the maximum speed range with its flight speed and efficiency close to those for a plane; it can promptly change the flight altitude, accelerate, and decelerate.

In comparison with a helicopter, the gyrocraft has higher horizontal and instantaneous vertical speeds with lower maneuvering ability in horizontal direction. Heading control is performed not by setting the tilt of the lifting rotor thrust vector but via controlling the thrust vector of the cruising rotor with external aerodynamic skidding at the developed side surface. Rotor rotation limits the ability of performing split-S and acrobatic maneuvers including loops, rolls, and overbanks. The single-rotor gyrocraft has only three degrees of freedom out of six. This makes its operation much simpler.

Heading, height, and flight speed control is provided. Simple and convenient control reduces the requirements on the quality of pilot training. A simple automation can be performed that is essential for both piloted aircraft safety and drone free-running Thus, the rotor rotation position is automatically maintained via setting the cyclic 'Air Wheel' rotor pitch, and the constant flight altitude is maintained by setting the collective pitch. Heading control is provided via the rudder. The flight speed depends on the engine power and cruising rotor pitch. Active deceleration performed via the cruising rotor and emergency deceleration performed by body turning is available.

For all flight modes, longitudinal and lateral fly-wheel control of the gyrocraft is provided, so there are no aircraft lift-to-drag ratio trimming losses. Aircraft stability is not affected by atmosphere turbulence. This gyrocraft property provides its outstanding convenience and all-weather capability. Stability is a very important property for drones especially for small ones operating under low Reynolds number conditions.

The gyrocraft is beyond competition if the focus is on reliability and all-weather capacity of a vehicle along with its safety and passenger comfort rather than on capability of performing split-S and acrobatic maneuvers. High stabilization and stability during the flight eliminate the chances for out-of-control piloting that is an important argument in favour of permission of gyrocraft flights over towns.

Flight Speed Range

The gyrocraft has the maximum flight speed range in comparison to other aircraft with the same power output of the power unit. Due to the use of a flywheel, the gyrocraft has a higher climb performance. Gyrocraft controllability and high stability are provided for all flight modes and speeds.

By tilting the thrust vector of the cruising rotor contrary to the lifting rotor rotation direction, the one-rotor gyrocraft can be transformed into a conventional helicopter (see FIG. 22b). Thus it can hover and control longitudinal and lateral shifts by means of a swashplate without changing the rotor rotation plane position. In the absence of front wind, the gyrocraft can hover at a given height using less power from the power unit as compared to that for a helicopter with negative energy balance. Cruising rotor thrust reversing allows the gyrocraft to perform rearward flight.

Providing the power unit is sufficient, the maximum horizontal speed of rotor-winged aircraft is limited by three factors, including rotor strength, its stability at high speeds, and high rotor aerodynamic drag. The 'Air Wheel' rotor eliminates these flight speed limitations. The outer wing encompasses the loads thus increasing rotor strength. The wing creates the main lift, provides reduction of blade loads with setting their twist equal to zero, eliminating imbalance and the conditions causing shock-wave and slap effects. The wing wafts the air flow, and rotor blades are located within the air shadow area moving in the 'slow down' wake region. A thin 'Air Wheel' rotor has low profile drag, which provides high lift-to-drag ratio of the rotor with achievement of high flight speeds by means of a reciprocating or electrical motor employed as the power unit (see FIGS. 21-23).

Use of a gas-turbine engine enables flights at transonic and ultrasonic speeds (see FIG. 24). For example, designing a gyro-stabilized supersonic VTOL-type aircraft having two transversely arranged rotors (see FIG. 24.a) is contemplated. By using fans of small diameter, the aircraft can vertically take off and land in almost all weather conditions. Enforced gyroscopic stabilization in pitch and roll does not affect yaw of the gyrocraft while maintaining controllability, in contrast to poor control for aerodynamic stability. Enforced change of dihedral angle for rotor planes, due to gyroscopic effect, results in clear change of pitch for the gyrocraft (see FIG. 24.b). A controllable roll of the gyrocraft can be achieved by enforced changing angles of attack for two rotors, the angles of attack being changed equally but in opposite direction.

Vertical Landing

Vertical gyrocraft landing, a designed landing method, is safe, reliable, and silent. No motor is required for safe landing. Descending is performed in autorotation mode, and landing is performed in helicopter mode. Landing without a runway on any unprepared site of the same size as that of the aircraft, roof, or ship board can be provided. Landing noise level is minimal as the motor operates in idle mode or stopped. During descent, horizontal speed does not increase; the 'Air Wheel' rotor flywheel effectively recovers all aircraft potential energy. A planar rim operates as a parachute, suppressing rotor precession. A variable twist of thin blades provides the maximum 'Air Wheel' rotor efficiency for autorotation mode eliminating the ring vortex conditions. The higher loading of the rotor area results in the lower effects of atmosphere turbulence and higher descending rate in autorotation mode. The large amount of energy stored by the rotor provides its compensation and changes the mode to helicopter mode prior to soft landing. Short overloading eliminates vortex ring formation.

During descent, control is provided via the swashplate. Precise control of longitudinal and lateral shifts is performed by setting the cyclic pitch without significant change in the rotor rotation position; descending rate control and rotor flare prior to soft landing are provided via setting the collective pitch. Cruising rotor thrust reversing is used for suppressing the residual horizontal speed. The amount of energy stored by the flywheel is sufficient to break landing, hover, and fly to the other point. Landing is safe and reliable, and its noise level is less than it is for conventional gyrocraft. The accelerated 'Air Wheel' rotor flywheel provides stabilization of the tilt and pitch, providing simpler operation during gliding descent and landing; fully automated landing can be provided.

After landing, the gyrocraft maintains stability in strong winds in contrast with helicopters, and can force itself down to the site or swinging board. The 'Air Wheel' rotor does not require a braking system, its blades will not trail to the ground, hit people, or cut off the tail boom.

Flying Distance and Efficiency

There is a universal formula for calculation of flying distances for planes, helicopters, and any heavier-than-air aircraft (M. L. Mil et al. Helicopters. Calculations and Design. M. Mashinostr. 1967. Volume 1. page 27):

$$L = 270 \frac{Gt}{G} \frac{Cl}{Cd} \frac{\eta \xi}{Ce}$$

where:
Gt—fuel weight;
G—aircraft weight (averaged over the flight time);
Cl/Cd—lift-to-drag ratio, or L/D ratio;
Ce—specific engine fuel consumption;
η—rotor efficiency,
ξ—the coefficient accounting for transmission power losses.

As can be seen from the above formula, the higher flying distance is provided by the higher fuel weight fraction in the total aircraft weight, higher lift-to-drag ratio, higher engine efficiency and motor efficiency, and lower power losses in the transmission and auxiliary devices.

A helicopter is optimized for long-term hovering at the height, and in this respect it is more effective than other types of heavier-than-air aircraft. The gyrocraft take-off, landing, and most importantly flight are more effective than a helicopter in all parameters that define both speed and flying distance:

The gyrocraft design is simpler, it has less weight, higher weight figure of merit, and higher useful load fraction.
Even providing a lower power of the power unit and smaller rotor diameter, it has a higher take-off weight due to the use of a flywheel.
Lift-to-drag ratio of the lifting rotor and the whole device is higher. A streamlined gyrocraft lifting fuselage creates lift during horizontal flight. The body, long tail boom, and control rotor of a helicopter result in parasite drag only.
The 'Air Wheel' rotor provides a variable twist for blades, and its efficiency is higher than that of a lifting rotor having thick blades with a fixed twist.
Direct drive for the cruising rotor provides power transmission without power losses in the gearbox and transmission, without anti-torque moment, and without the use of a control rotor.
At cruise speed, a cruising rotor operating as a motor has a maximum efficiency that is higher than that of a large lifting rotor operating in crossed flow mode.
A motor more efficient than a gas-turbine engine can be used as the gyrocraft power unit.
The gyrocraft has the minimum fuel consumption for take-off and landing flight stages while this value for a helicopter and other aircraft is maximum for these flight stages.

Flying distance of the gyrocraft is significantly higher than that of a helicopter and other vertical take-off aircraft and is close to that of planes. A plane has the highest fuel efficiency for stratospheric flights for long distances. The gyroplane is most effective for tropospheric flights for short and average distances.

Flying distance is the critical factor for flights over seas and for planes tied to fly grounds with strict requirements on landing conditions. In case of an all-weather vertical take-off and landing aircraft using fuel from a developed filling station chain, a high flying distance is a mere factor accounted for high efficiency and, therefore, high ecological performance.

High fuel efficiency provides a lower per flight-hour cost for a piloted gyrocraft, and larger flying distance and higher availability time for drones.

Reliability and Safety

Due to the absence of reliable, safe, and simply operated aircraft today, only professionals and some extreme sports lovers are engaged in aviation.

The gyrocraft design is conceptually safe and reliable. The monolithic 'Air Wheel' rotor is safer than the popular two-blade rotors and more reliable than complex multi-bladed rotors with blade fastening via joints. The 'Air Wheel' rotor does not have any flight speed limitations. The strength and operation time of the monolithic lifting rotor are the highest. The blades are protected from the wires, twigs, and other outer obstructions via a rim. The 'Air Wheel' rotor flywheel ensures safety in case of failures of the motor, gearbox, and other systems. Gyrocraft robustness eliminates need for power unit backup and system redundancy providing aircraft weight reduction and higher efficiency. Low production costs are provided by the implementation of available materials along with simple and maintainable design. The requirements on the performance of the power unit are lower, with no augmented take-off and emergency operation modes. The engine always operates in the normal most effective mode with maximum operating time. No cabin sealing and complex oxygen supply equipment are required for the tropospheric flights for which the gyrocraft is the most effective. The aircraft capital, maintenance, and per flight-hour costs are reduced.

Gyrocraft safety is one of the highest in comparison with not only aircraft but also with the other types of transport systems. The gyrocraft has all opportunity to become a reliable and safe personal vehicle. Gyrocraft operation is maximally simplified and does not require a highly skilled pilot; pilots' errors are not fatal. The gyrocraft does not have any hazardous modes; no spin, devastating beats, or overturns are possible. Even sudden decrease in rotor rotation rate does not lead to blades folding; the gyrocraft with the 'Air Wheel' rotor deploys its parachute and performs landing.

The available power is many times higher than that of the power unit, and high climb performance allows the device to avoid bumping up against obstacles when flying at lowest allowable altitudes under low-visibility conditions.

The gyrocraft can have the widest range of safe flight speeds; in comparison with all the other aircraft it is the least susceptible to atmospheric turbulence. Stability of the rotating flywheel provides all-weather capability and comfortable operation.

The gyrocraft can combine the advantages of different aircraft:
vertical take-off and landing typical for helicopters,
flight speed, flying distance, and efficiency of airplanes,
simple operation and design standard for gyrocraft,
low noise level for engineless take-off typical for air balloons, in combination with all-weather capability, safety, and reliability.

These features allow creation of efficient automated personal and multi-seated aircraft with a wide range of applications.

Human error is the main factor affecting vehicle safety. Considering today's availability of accurate navigational guidance, reliable and fully automated aircraft can be created. It is much simpler, cheaper, and more feasible than creation of a safe automated car. A simple decentralized safe control system for controlling intensive air traffic can be provided.

The gyrocraft represents an eco-friendly solution for travelling in remote open spaces and overcrowded cities. Air space transport capacity and its traffic capacity are many times higher than those for the road system, with the costs of alienated land, building and maintenance of roads, bridges, tunnels, underpasses, and parking arrangement. The metropolitan resources for road system extension are depleted, which results in the collapse of road system development with hard ecological and macroeconomic consequences.

The gyrocraft provides decreasing ground traffic, reducing time losses due to traffic jams, reducing population losses due to transport accidents, improving metropolitan ecology, and free-moving, fast, and safe automated vehicles.

The invention claimed is:

1. A variable-pitch rotor comprising two or more coaxial spaced-apart hubs connected to a closed wing by variable-twist elastic blades, wherein the variable-twist elastic blades have a torsional stiffness greater than zero and less than a torsional stiffness of a fixed or viscoelastic connection of the variable-twist elastic blades with the closed wing.

2. The rotor according to claim 1, wherein the rotor provides a blade pitch control.

3. The rotor according to claim 1, wherein the blade pitch is controlled, in part or in whole, by setting relative position of two hubs.

4. The rotor according to claim 1, wherein the torsional elastic blades have a variable profile camber.

5. The rotor according to claim 1, wherein torsional and bending rigidity varies along the blades.

6. The rotor according to claim 1, wherein the blades have a complex three-dimensional shape comprising at least one of bends, flares, Y-junctions, tapers, junctures, supporting struts, and tiltable slats and flaps.

7. The rotor according to claim 1, wherein the blades are moveably coupled to the hubs by one of a torsion bar, a feathering hinge, and an offset hinge.

8. The rotor according to claim 1, wherein the blades are rigidly coupled to the hubs, the blades being equipped with tiltable elastic flaps.

9. The rotor according to claim 8, wherein the tiltable flaps are moveably coupled to the blades in a viscoelastic manner.

10. The rotor according to claim 1, wherein the blades and the closed wing are flexible and have internal volumes that are filled with gas or liquid at positive pressure.

11. The rotor according to claim 1, wherein the rotor is foldable and comprises jointed segments of a wing and blades.

12. The rotor according to claim 1, wherein the closed wing can function as a rotor of an electrical machine.

13. A gyro-stabilized aircraft, wherein the aircraft comprises one or more rotors according to claim 1.

14. A wind-driven power generator, wherein the generator comprises one or more rotors according to claim 1.

15. A stationary launching device for the aircraft of claim 13, wherein the launching device is connected to the aircraft to transfer energy for an initial spinning of rotors of the aircraft.

* * * * *